US012598550B2

(12) United States Patent
Lee et al.

(10) Patent No.: US 12,598,550 B2
(45) Date of Patent: Apr. 7, 2026

(54) METHOD OF TRANSMITTING AND RECEIVING DOWNLINK CONTROL CHANNEL AND APPARATUS THEREFOR

(71) Applicant: LG ELECTRONICS INC., Seoul (KR)

(72) Inventors: Sunghoon Lee, Seoul (KR); Jaehyung Kim, Seoul (KR); Seunggye Hwang, Seoul (KR); Youngdae Lee, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 18/140,551

(22) Filed: Apr. 27, 2023

(65) Prior Publication Data

US 2023/0354193 A1 Nov. 2, 2023

Related U.S. Application Data

(60) Provisional application No. 63/336,238, filed on Apr. 28, 2022.

(51) Int. Cl.
H04W 52/02 (2009.01)
H04W 72/0457 (2023.01)
(Continued)

(52) U.S. Cl.
CPC ... H04W 52/0229 (2013.01); H04W 72/0457 (2023.01); H04W 72/232 (2023.01); H04W 76/28 (2018.02)

(58) Field of Classification Search
CPC ......... H04W 52/0229; H04W 72/0457; H04W 72/232; H04W 76/28
See application file for complete search history.

(56) References Cited

U.S. PATENT DOCUMENTS

| 12,022,309 B2 * | 6/2024 | Jiao | .................. | H04W 72/0446 |
| 2020/0322929 A1 * | 10/2020 | Bagheri | ............... | H04L 5/0053 |

(Continued)

FOREIGN PATENT DOCUMENTS

WO 2022071688 4/2022

OTHER PUBLICATIONS

Japan Patent Office Application No. 2023-064699, Office Action dated Apr. 16, 2024, 6 pages.

(Continued)

*Primary Examiner* — Jael M Ulysse
(74) *Attorney, Agent, or Firm* — LEE, HONG, DEGERMAN, KANG & WAIMEY

(57) ABSTRACT

The present disclosure provides a method of receiving a physical downlink control channel (PDCCH) by a user equipment (UE) in a wireless communication system. The method may include: receiving (i) a first parameter related to a bandwidth part (BWP) and (ii) a second parameter related to a plurality of search space (SS) sets included in the BWP through higher layers; monitoring only a specific SS set among the plurality of SS sets; based on that a first PDCCH is received in the specific SS set, monitoring all of the plurality of SS sets; and receiving a second PDCCH in one SS set among the plurality of SS sets. Based on that the one SS set is the specific SS set, monitoring of other SS sets except for the specific SS set among the plurality of SS sets may be terminated.

12 Claims, 20 Drawing Sheets

(51) Int. Cl.
    *H04W 72/232*        (2023.01)
    *H04W 76/28*         (2018.01)

(56)            References Cited

U.S. PATENT DOCUMENTS

| | | | | |
|---|---|---|---|---|
| 2020/0351682 | A1* | 11/2020 | Cirik | H04W 76/28 |
| 2021/0105722 | A1* | 4/2021 | Tsai | H04W 52/0235 |
| 2021/0136690 | A1* | 5/2021 | Zhou | H04W 52/0229 |
| 2021/0227470 | A1* | 7/2021 | Awoniyi-Oteri | H04W 76/28 |
| 2021/0345308 | A1* | 11/2021 | Liu | H04W 72/23 |
| 2022/0039009 | A1* | 2/2022 | Iyer | H04L 5/0098 |
| 2022/0070909 | A1* | 3/2022 | Takeda | H04L 5/0053 |
| 2022/0116980 | A1* | 4/2022 | Pardhasarathy | H04L 5/0091 |
| 2022/0240160 | A1* | 7/2022 | Jang | H04L 1/1893 |
| 2022/0295457 | A1* | 9/2022 | Jang | H04L 5/0053 |
| 2022/0345922 | A1* | 10/2022 | Guo | H04L 5/0053 |
| 2022/0369298 | A1* | 11/2022 | Lin | H04L 5/0096 |
| 2022/0417775 | A1* | 12/2022 | Cirik | H04B 7/088 |
| 2023/0007504 | A1* | 1/2023 | Jang | H04B 7/0695 |
| 2023/0125672 | A1* | 4/2023 | Grossmann | H04L 5/0053 |
| 2023/0189392 | A1* | 6/2023 | Babaei | H04L 5/0055 370/329 |
| 2023/0262705 | A1* | 8/2023 | Choi | H04W 72/21 370/329 |
| 2023/0269742 | A1* | 8/2023 | Kuang | H04W 72/1263 370/329 |
| 2023/0319845 | A1* | 10/2023 | Guo | H04W 72/1273 370/329 |
| 2023/0354364 | A1* | 11/2023 | Guo | H04W 72/232 |
| 2023/0354371 | A1* | 11/2023 | Huang | H04W 72/232 |
| 2024/0334446 | A1* | 10/2024 | Kuang | H04L 5/0053 |

OTHER PUBLICATIONS

ZTE et al., "On Capacity and Power Working Areas for XR," 3GPP TSG RAN WG1 #106-e, R1-2106529, Aug. 2021, 10 pages.

Rapporteur (Qualcomm), TR for Study on XR (Extended Reality) Evaluations for NR[online], 3GPP TSG RAN #94e, RP-212989, Internet <URL:https://www.3gpp.org/ftp/tsg_ran/TSG_RAN/TSGR_94e/Docs/RP-212989.zip>, Nov. 2021, 248 pages.

CATT, "PDCCH skipping and Search Space Set Group switching," 3GPP TSG RAN WG1 #107-e, R1-2111270, Nov. 2021, 4 pages.

* cited by examiner

Scheduling start

PDCCH monitoring

Data Reception

Time Interval
(e.g., subframe, slot)

Paging DRX Cycle

'RRC_Connected' state

'RRC_Idle' state

Receiving information related to Capability of UE ~ S901

Transmitting at least one information for configuring DRX operation and/or a PDCCH monitoring adaptation ~ S903

Transmitting a first PDCCH related to the PDCCH monitoring adaptation ~ S905

Monitoring a second PDCCH and PDSCH based on the first PDCCH ~ S907

(a)

(b)

(c)

(a)

(b)

(c)

Reporting first information related to Capability of UE ～S1301

Receiving second information for configuring a PDCCH monitoring pattern ～S1303

Receiving a first PDCCH through a SS set ～S1305

Monitoring a second PDCCH based on the SS Set in which the first PDCCH is received ～S1307

Receiving PDSCH based on the second PDCCH ～S1309

METHOD OF TRANSMITTING AND RECEIVING DOWNLINK CONTROL CHANNEL AND APPARATUS THEREFOR

CROSS-REFERENCE TO RELATED APPLICATION(S)

Pursuant to 35 U.S.C. § 119(e), this application claims the benefit of U.S. Provisional Patent Application No. 63/336, 238, filed on Apr. 28, 2022, the contents of which are all hereby incorporated by reference herein in their entirety.

BACKGROUND

Technical Field

The present disclosure relates to a method of transmitting and receiving a downlink control channel and apparatus therefor, and more particularly, to a method of configuring physical downlink control channel (PDCCH) monitoring adaptation for extended reality (XR) packets and transmitting and receiving a PDCCH based on the configured PDCCH monitoring adaptation and apparatus therefor.

Discussion of the Related Art

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

Accordingly, the present disclosure is directed to a method of transmitting and receiving a downlink control channel and apparatus therefor that substantially obviates one or more problems due to limitations and disadvantages of the related art.

An object of the present disclosure is to provide a method of transmitting and receiving a downlink control channel and an apparatus therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a method of receiving a physical downlink control channel (PDCCH) by a user equipment (UE) in a wireless communication system. The method may include: receiving (i) a first parameter related to a bandwidth part (BWP) and (ii) a second parameter related to a plurality of search space (SS) sets included in the BWP through higher layers; monitoring only a specific SS set among the plurality of SS sets; based on that a first PDCCH is received in the specific SS set, monitoring all of the plurality of SS sets; and receiving a second PDCCH in one SS set among the plurality of SS sets. Based on that the one SS set is the specific SS set, monitoring of other SS sets except for the specific SS set among the plurality of SS sets may be terminated.

In this case, the UE may not be configured with a discontinuous reception (DRX) operation.

Based on (i) that the one SS set is not the specific SS set and (ii) that the second PDCCH indicates PDCCH monitoring adaptation, the SS sets except for the specific SS set among the plurality of SS sets may be monitored.

Based on that the one SS set is the specific SS set, only the specific SS set may be monitored.

The plurality of SS sets may be configured for extended reality (XR) packets.

In another aspect of the present disclosure, there is provided a UE configured to receive a PDCCH in a wireless communication system. The UE may include: at least one transceiver; at least one processor; and at least one memory operably connected to the at least one processor and configured to store instructions that, when executed, cause the at least one processor to perform operations. The operations may include: receiving (i) a first parameter related to a BWP and (ii) a second parameter related to a plurality of SS sets included in the BWP through higher layers through the at least one transceiver; monitoring only a specific SS set among the plurality of SS sets; based on that a first PDCCH is received in the specific SS set, monitoring all of the plurality of SS sets; and receiving a second PDCCH in one SS set among the plurality of SS sets through the at least one transceiver. Based on that the one SS set is the specific SS set, monitoring of other SS sets except for the specific SS set among the plurality of SS sets may be terminated.

In this case, the UE may not be configured with a DRX operation.

Based on (i) that the one SS set is not the specific SS set and (ii) that the second PDCCH indicates PDCCH monitoring adaptation, the SS sets except for the specific SS set among the plurality of SS sets may be monitored.

Based on that the one SS set is the specific SS set, only the specific SS set may be monitored.

The plurality of SS sets may be configured for XR packets.

In another aspect of the present disclosure, there is provided an apparatus configured to receive a PDCCH in a wireless communication system. The apparatus may include: at least one processor; and at least one memory operably connected to the at least one processor and configured to store instructions that, when executed, cause the at least one processor to perform operations. The operations may include: receiving (i) a first parameter related to a BWP and (ii) a second parameter related to a plurality of SS sets included in the BWP through higher layers; monitoring only a specific SS set among the plurality of SS sets; based on that a first PDCCH is received in the specific SS set, monitoring all of the plurality of SS sets; and receiving a second PDCCH in one SS set among the plurality of SS sets. Based on that the one SS set is the specific SS set, monitoring of other SS sets except for the specific SS set among the plurality of SS sets may be terminated.

In another aspect of the present disclosure, there is provided a computer-readable storage medium including at least one computer program that causes at least one processor to perform operations. The operations may include: receiving (i) a first parameter related to a BWP and (ii) a second parameter related to a plurality of SS sets included in the BWP through higher layers; monitoring only a specific SS set among the plurality of SS sets; based on that a first PDCCH is received in the specific SS set, monitoring all of the plurality of SS sets; and receiving a second PDCCH in one SS set among the plurality of SS sets. Based on that the one SS set is the specific SS set, monitoring of other SS sets except for the specific SS set among the plurality of SS sets may be terminated.

In another aspect of the present disclosure, there is provided a method of transmitting a PDCCH by a base station in a wireless communication system. The method may include: transmitting (i) a first parameter related to a BWP and (ii) a second parameter related to a plurality of SS sets included in the BWP through higher layers; and based on that a first PDCCH is transmitted in only a specific SS set among the plurality of SS sets, transmitting a second PDCCH in one SS set of the plurality of SS sets. Based on that the one SS set is the specific SS set, a third PDCCH may not be transmitted in other SS sets except for the specific SS set among the plurality of SS sets.

In another aspect of the present disclosure, there is provided a base station configured to transmit a PDCCH in a wireless communication system. The base station may include: at least one transceiver; at least one processor; and at least one memory operably connected to the at least one processor and configured to store instructions that, when executed, cause the at least one processor to perform operations. The operations may include: transmitting (i) a first parameter related to a BWP and (ii) a second parameter related to a plurality of SS sets included in the BWP through higher layers through the at least one transceiver; and based on that a first PDCCH is transmitted in only a specific SS set among the plurality of SS sets, transmitting a second PDCCH in one SS set of the plurality of SS sets through the at least one transceiver. Based on that the one SS set is the specific SS set, a third PDCCH may not be transmitted in other SS sets except for the specific SS set among the plurality of SS sets.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
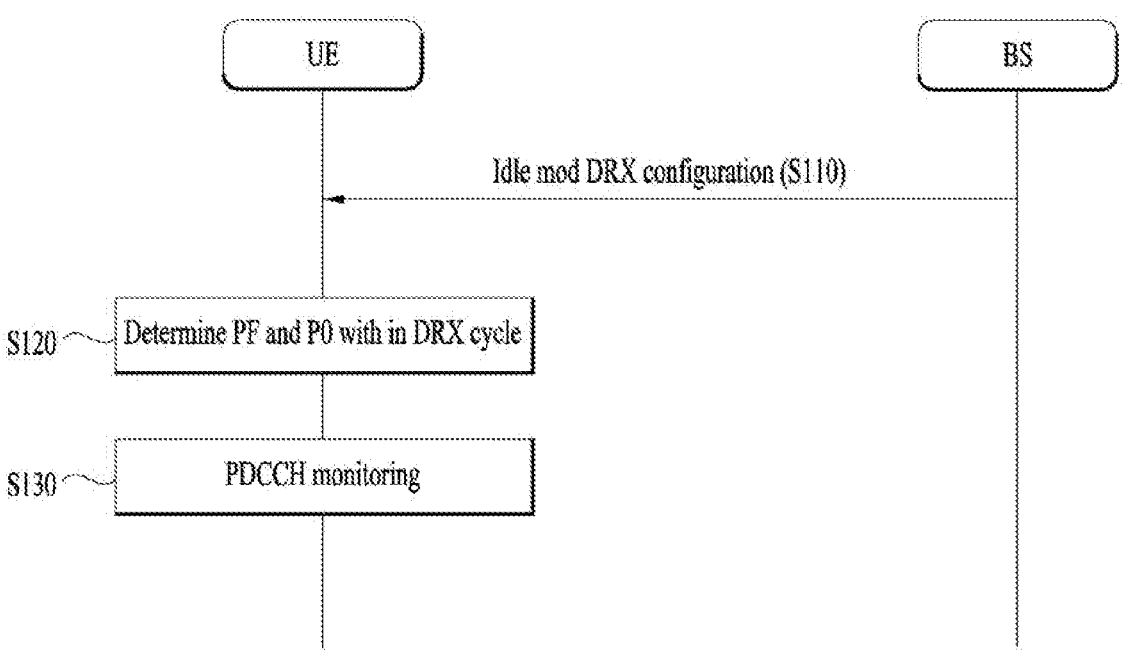
FIGS. 1 and 2 are diagrams for explaining idle mode discontinuous reception (DRX) operation.

Reference will now be made in detail to the preferred embodiments of the present disclosure, examples of which are illustrated in the accompanying drawings. Wherever possible, the same reference numbers will be used throughout the drawings to refer to the same or like parts.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DRX (Discontinuous Reception) Operation

The UE uses Discontinuous Reception (DRX) in RRC_IDLE and RRC_INACTIVE state in order to reduce power consumption. When the DRX is configured, the UE performs a DRX operation according to DRX configuration information. When the UE operates based on the DRX, the UE repeats ON/OFF for reception. For example, when the DRX is configured, the UE attempts to receive/detect the PDCCH (e.g., PDCCH monitoring) only in a predetermined time interval (e.g., ON), and does not attempt to receive the PDCCH in the remaining time period (e.g., OFF/sleep).

At this time, a time period during which the UE should attempt to receive the PDCCH is referred to as an On-duration, and this on-duration is defined once per DRX cycle. The UE can receive DRX configuration information from a gNB through a RRC signaling and operate as the DRX through a reception of the (Long) DRX command MAC CE.

The DRX configuration information may be included in the MAC-CellGroupConfig. The IE MAC-CellGroupConfig is used to configure MAC parameters for a cell group, including DRX.

DRX (Discontinuous Reception) means an operation mode for enabling a UE (User Equipment) to reduce battery consumption so that the UE can receive/monitor a downlink channel discontiguously. That is, a UE configured with DRX can reduce power consumption by receiving a DL signal discontiguously. The DRX operation is performed in a DRX cycle indicative of a time interval in which On Duration is periodically repeated. The DRX cycle includes On Duration and sleep duration (or Opportunity for DRX). The On Duration indicates a time interval in which a UE monitors a PDCCH in order to receive the PDCCH. DRX may be performed in an RRC (Radio Resource Control)_IDLE state (or mode), an RRC_INACTIVE state (or mode), or an RRC_CONNECTED state (or mode). In the RRC_IDLE state and the RRC_INACTIVE state, DRX is used to receive a paging signal discontiguously.

- RRC_Idle state: state in which a radio connection (RRC connection) is not established between a base station and a UE.
- RRC_Inactive state: state in which a radio connection (RRC connection) has been established between a base station and a UE, but a radio connection is inactivated.
- RRC_Connected state: state in which a radio connection (RRC connection) has been established between a base station and a UE.
- DRX is basically divided into idle mode DRX, Connected DRX (C-DRX) and extended DRX. DRX applied in the RRC IDLE state is called idle mode DRX, and DRX applied in the RRC CONNECTED state is called Connected mode DRX (C-DRX).

eDRX (Extended/enhanced DRX) is a mechanism capable of expanding the cycle of idle mode DRX and C-DRX. In the idle mode DRX, whether to permit eDRX may be configured based on system information (e.g., SIB1).

The SIB1 may include an eDRX-Allowed parameter. The eDRX-Allowed parameter is a parameter indicating whether idle mode extended DRX is permitted.

(1) IDLE Mode DRX

In the IDLE mode, the UE may use DRX to reduce power consumption. One paging occasion (PO) may be a time interval (e.g., a slot or a subframe) in which a paging-radio network temporary identifier (P-RNTI) based physical downlink control channel (PDCCH) may be transmitted. The P-RNTI-based PDCCH may address/schedule a paging message. For P-RNTI-based PDCCH transmission, the PO may indicate a first subframe for PDCCH repetition.

One paging frame (PF) is one radio frame which may include one or a plurality of paging occasions. When DRX is used, a UE may be configured to monitor only one PO per DRX cycle. The PF, PO and/or PNB may be determined based on a DRX parameter provided via network signaling (e.g., system information).

Hereafter, 'PDCCH' may refer to MPDCCH, NPDCCH and/or normal PDCCH. Hereafter, 'UE' may refer to MTC UE, BL (Bandwidth reduced Low complexity)/CE (coverage enhanced) UE, NB-IoT UE, Reduced Capability (Red-Cap) UE, normal UE and/or IAB-MT (mobile termination).

FIG. 1 is a flowchart showing an example of a method of performing an idle mode DRX operation.

A UE receives, from a base station, idle mode DRX configuration information through a higher layer signaling (e.g., system information) (S110).

Furthermore, the UE determines a PF (Paging Frame) and a PO (Paging Occasion), for monitoring a physical downlink control channel (e.g., PDCCH) in a paging DRX cycle based on the idle mode DRX configuration information (S120). In this case, the DRX cycle includes On Duration and sleep duration (or Opportunity for DRX).

Furthermore, the UE monitors a PDCCH in the PO of the determined PF (S130). The UE monitors only one time interval (PO) for each paging DRX cycle. For example, the time interval may be a slot or a subframe.

Additionally, if the UE receives a PDCCH (more exactly, CRC of PDCCH) scrambled by a P-RNTI during On Duration (i.e., if paging is detected), the UE may transit to a connected mode and transmit or receive data with the base station.

Figure 2:
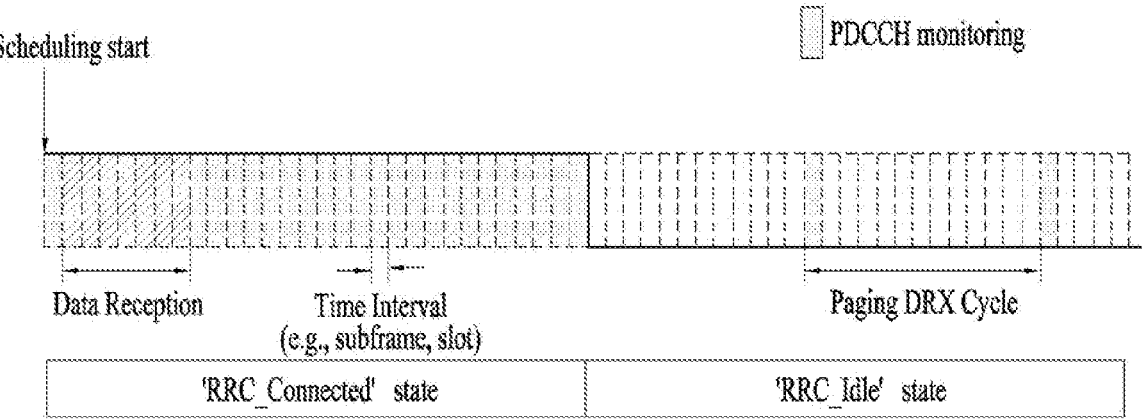

FIG. 2 is a diagram showing an example of an idle mode DRX operation.

Referring to FIG. 2, if there is a traffic (data) toward a UE in the RRC_Idle state (hereinafter referred to as 'Idle state'), paging occurs toward the corresponding UE.

Thus, the UE wakes up every (paging) DRX cycle and monitors a PDCCH.

If paging is present, the UE transits to a connected state, and receives data. Otherwise, the UE may enter a sleep mode again.

Figure 3:
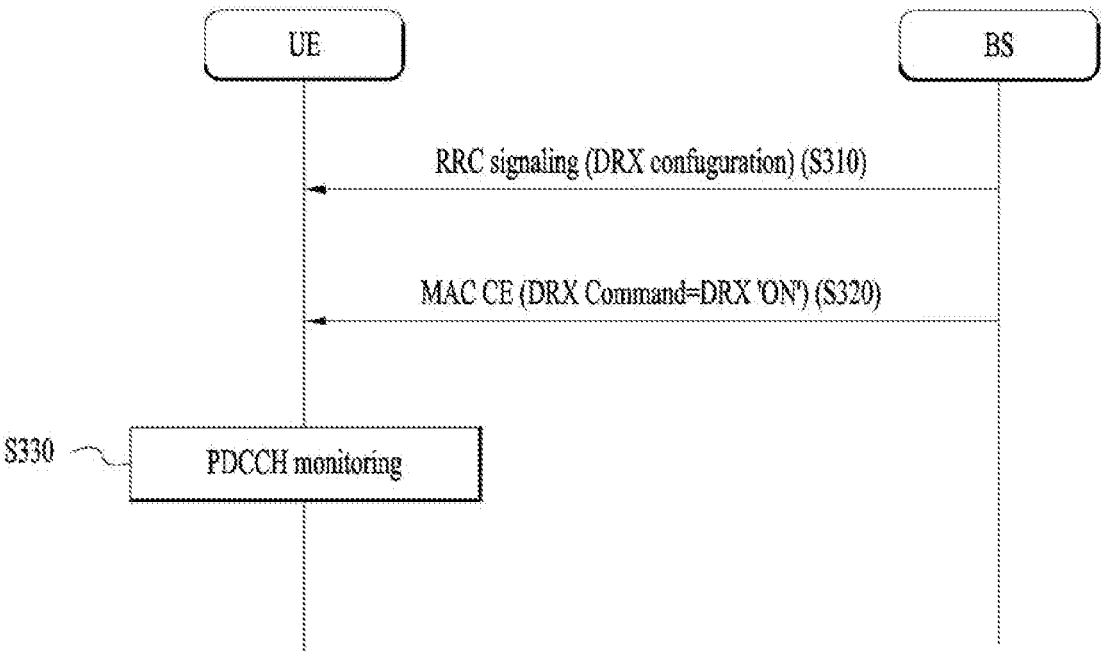
FIGS. 3 to 5 are diagrams for explaining DRX operation in a radio resource control (RRC) connected mode.

FIG. 3 is a flowchart showing an example of a method of performing a C-DRX operation.

A UE receives, from a base station, RRC signalling (e.g., MAC-MainConfig IE) including DRX configuration information (S310). The DRX configuration information may include the following information.

- on-duration: the duration that the UE waits for, after waking up, to receive PDCCHs. If the UE successfully decodes a PDCCH, the UE stays awake and starts the drx-inactivity timer;
- drx-onDurationTimer: the duration in which the DRX cycle starts. For example, the duration may refer to a time interval to be continuously monitored at the beginning of a DRX cycle, which may be represented in units of milliseconds (ms).
- drx-InactivityTimer: the duration after the PDCCH occasion in which a PDCCH indicates a new UL or DL transmission for the MAC entity. For example, the duration may be a time interval represented in units of ms after the UE decodes the PDCCH including scheduling information. That is, the duration refers to a duration in which the UE waits to successfully decode another PDCCH after decoding the PDCCH. If no other PDCCHs are detected within the corresponding duration, the UE transitions to the sleep mode.

The UE restarts the drx-inactivity timer after successfully decoding a PDCCH for initial transmission only except for a PDCCH for retransmission.

drx-RetransmissionTimer: for DL, the maximum duration until a DL retransmission is received; for UL the maximum duration until a grant for UL retransmission is received. For example, for UL, drx-Retransmission-Timer indicates the number of slots in a bandwidth part (BWP) where a transport block (TB) to be retransmitted is transmitted. For DL, drx-RetransmissionTimer indicates the number of slots in a BWP in which a TB to be retransmitted is received.

longDRX-Cycle: On Duration occurrence period drxStartOffset: a subframe number in which a DRX cycle is started drxShortCycleTimer: the duration the UE shall follow the Short DRX cycle;

shortDRX-Cycle: a DRX Cycle operating as much as a drxShortCycleTimer number when Drx-Inactivity-Timer is terminated drx-SlotOffset: the delay before drx-onDurationTimer starts. For example, the delay may be expressed in units of ms, and more particularly, in multiples of $\frac{1}{32}$ ms.

Active time: total duration that the UE monitors PDCCH, which may include (a) the "on-duration" of the DRX cycle, (b) the time UE is performing continuous reception while the drx-inactivity timer has not expired, and (c) the time when the UE is performing continuous reception while waiting for a retransmission opportunity.

Specifically, when the DRX cycle is configured, an active time for a serving cell of a DRX group includes the following.

(a) drx-onDurationTimer or (b) drx-InactivityTimer configured for the DRX group is running; or (c) drx-RetransmissionTimerDL or drx-Retransmission-TimerUL is running on any Serving Cell in the DRX group; or (d) ra-ContentionResolutionTimer or msgB-Response-Window is running; or (e) a Scheduling Request is sent on PUCCH and is pending; or (f) a PDCCH indicating a new transmission addressed to the C-RNTI of the MAC entity has not been received after successful reception of a Random Access Response for the Random Access Preamble not selected by the MAC entity among the contention-based Random Access Preamble.

Furthermore, if DRX 'ON' is configured through the DRX command of a MAC CE (command element) (S320), the UE monitors a PDCCH for the ON duration of a DRX cycle based on the DRX configuration (S330).

Figure 4:
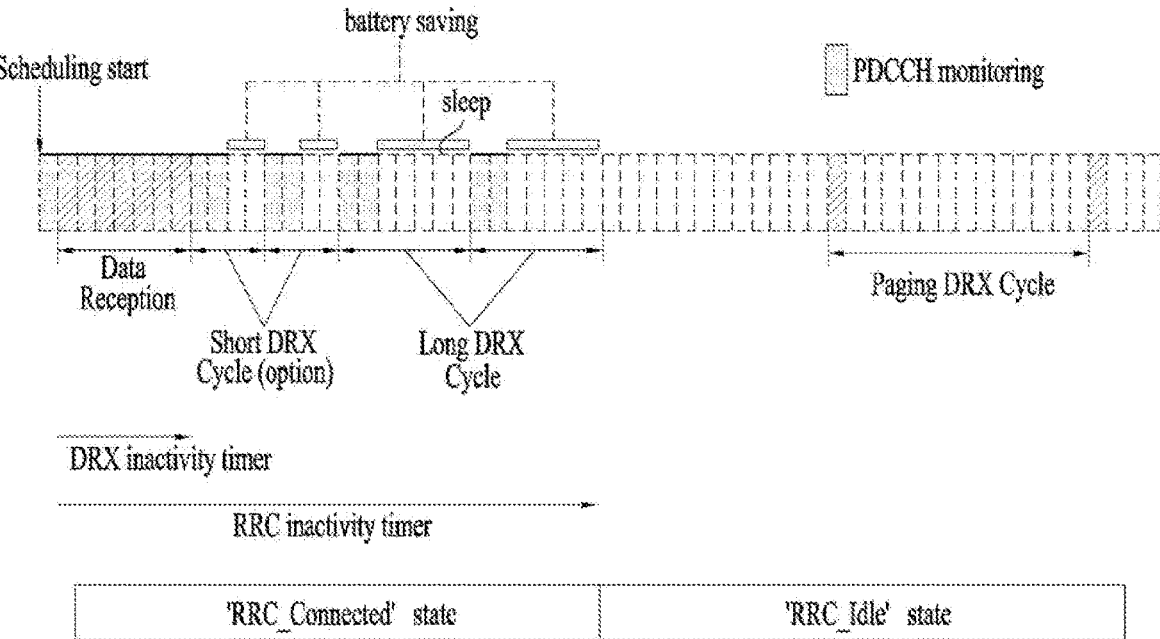

FIG. 4 is a diagram showing an example of a C-DRX operation.

Referring to FIG. 4, when the UE receives scheduling information (e.g., DL assignment or UL grant) in the RRC_Connected state (hereinafter referred to as the connected state), the UE runs a DRX inactivity timer and an RRC inactivity timer.

After the DRX inactivity timer expires, a DRX mode starts. The UE wakes up in a DRX cycle and monitors a PDCCH during a predetermined time (on duration timer).

In this case, if Short DRX is configured, when the UE starts the DRX mode, the UE first starts in a short DRX cycle, and starts to a long DRX cycle after the short DRX cycle is terminated. The Long DRX cycle is a multiple of the short DRX cycle. In the short DRX cycle, the UE wakes up more frequently. After the RRC inactivity timer expires, the UE shifts to an idle state and performs an idle mode DRX operation.

Figure 5:
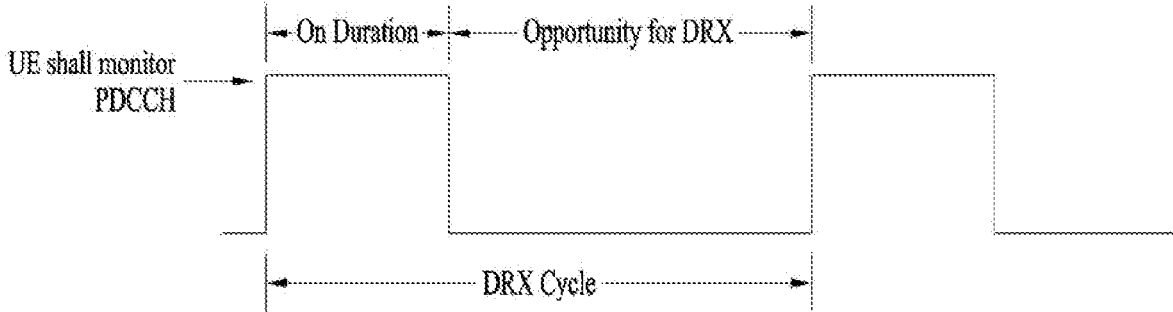

FIG. 5 illustrates a DRX cycle.

The C-DRX operation has been introduced for power saving of the UE. If the UE receives no PDCCH within the on-duration defined for each DRX cycle, the UE enters the sleep mode until the next DRX cycle and does not perform transmission/reception.

On the other hand, when the UE receives a PDCCH within the on-duration, the active time may continue (or increase) based on the operations of an inactivity timer, a retransmission timer, etc. If the UE receives no additional data within the active time, the UE may operate in the sleep mode until the next DRX operation.

In NR, a wake-up signal (WUS) has been introduced to obtain additional power saving gain in addition to the existing C-DRX operation. The WUS may be to inform whether the UE needs to perform PDCCH monitoring within the on-duration of each DRX cycle (or a plurality of DRX cycles). If the UE detects no WUS on a specified or indicated WUS occasion, the UE may maintain the sleep mode without performing PDCCH monitoring in one or more DRX cycles associated with the corresponding WUS.

(3) WUS (DCI Format 2_6)

According to the power saving technology of Rel-16 NR systems, when the DRX operation is performed, it is possible to inform the UE whether the UE needs to wake up for each DRX cycle by DCI format 2_6.

Figure 6:
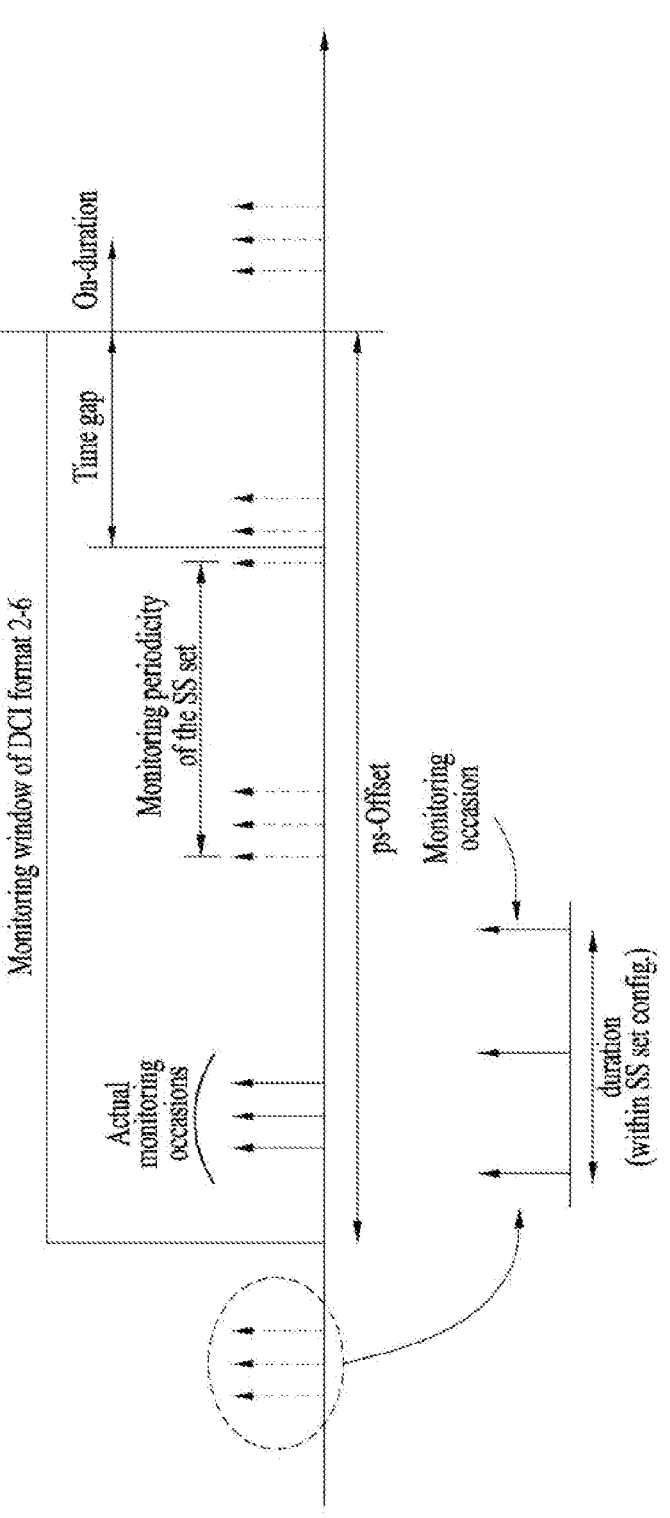
FIG. 6 is a diagram for explaining a method of monitoring DCI format 2_6.

Referring to FIG. 6, a PDCCH monitoring occasion for DCI format 2_6 may be determined by ps-Offset indicated by the network and a time gap reported by the UE. In this case, the time gap reported by the UE may be interpreted as a preparation period necessary for an operation after the UE wakes up.

Referring to FIG. 6, the base station (BS) may provide the UE with a search space (SS) set configuration capable of monitoring DCI format 2_6. According to the corresponding SS set configuration, DCI format 2_6 may be monitored in consecutive slots as long as the duration at the monitoring periodicity interval.

In the DRX configuration, a monitoring window for monitoring DCI format 2_6 may be determined by the start time of the DRX cycle (e.g., a point where the on-duration timer starts) and ps-Offset configured by the BS. In addition, PDCCH monitoring may not be required in the time gap reported by the UE. Consequently, an SS set monitoring occasion on which the UE actually performs monitoring may be determined as a first full duration (i.e., actual monitoring occasions of FIG. 6) within the monitoring window.

If the UE detects DCI format 2_6 in the monitoring window configured based on ps-Offset, the UE may be informed by the BS whether the UE wakes up in the next DRX cycle.

PDCCH Monitoring Adaptation

In NR standards, SS set group switching and PDCCH monitoring skipping have been defined to reduce the power consumption of the UE. The SS set group switching and PDCCH monitoring skipping are collectively defined as PDCCH monitoring adaptation.

(1) SS Set Group Switching

In the current NR standards, the SS set group switching has been defined to reduce the power consumption of the UE. According to the SS set group switching, the UE may be configured with a plurality of SS set groups, and an SS set group to be monitored by the UE among the plurality of SS set groups may be indicated. In addition, the UE may monitor an SS set included in the corresponding SS set group according to the corresponding indication and skip monitoring of SS sets not included in the corresponding SS set group.

For example, the UE may be provided with a list of SS set groups configured with a Type 3-PDCCH common search space (CSS) set and/or a user-specific search space (USS) set. In addition, if a list of SS set groups is provided, the UE may monitor SS sets corresponding to group index #0.

The UE may perform the SS set group switching operation depending on whether SearchSpaceSwitchTrigger is configured.

If SearchSpaceSwitchTrigger is configured for the UE, the UE may switch the SS set group according to the indication of DCI format 2_0.

For example, if the value of an SS Set Group Switching Flag field in DCI format 2_0 is 0, the UE may start monitoring SS set group #0 after a predetermined time from the time when the UE receives DCI format 2_0 and stop monitoring SS set group #1.

If the value of the SS Set Group Switching Flag field in DCI format 2_0 is 1, the UE may start monitoring SS set group #1 after a predetermined time from the time when the UE receives DCI format 2_0 and stop monitoring SS set group #0. If the UE starts monitoring SS set group #1, the UE may start counting a timer configured by SearchSpaceSwitchTimer. If the timer expires, the UE may start monitoring SS set group #0 after a predetermined time from the time when the timer expires and stop monitoring SS set group #1.

If SearchSpaceSwitchTrigger is not configured for the UE, the UE may change the SS set group based on DCI reception. For example, when the UE receives the DCI while monitoring SS set group #0 (or SS set group #1), the UE may start monitoring SS set group #1 (or SS set group #0) after a predetermined time from the time when the UE receives the DCI and stop monitoring SS set group #0 (or SS set group #1). In this case, the UE may start counting the timer configured by SearchSpaceSwitchTimer. If the timer expires, the UE may start monitoring SS set group #0 (or SS set group #1) after a predetermined time from the time when the timer expires and stop monitoring SS set group #1 (or SS set group #0).

The UE may start monitoring SS set group #0 (or SS set group #1) after the predetermined time from the time when the UE receives DCI format 2_0 as described above. In this case, monitoring SS set group #0 (or SS set group #1) after the predetermined time may mean that monitoring of SS set group #0 (or SS set group #1) may start from the first slot (or applicable slot boundary) after at least $P_{switch}$ symbols from the last symbol of the PDCCH including the received DCI. Alternatively, depending on subcarrier spacings, monitoring SS set group #0 (or SS set group #1) after the predetermined time may mean that monitoring of SS set group #0 (or SS set group #1) may start from the first slot in a group of specific slots after at least $P_{switch}$ symbols from the last symbol of the PDCCH including the received DCI. This is because the UE may need a prescribed time to decode the DCI, confirm the SS set group switching indication, and perform the SS set group switching operation actually.

In this case, $P_{switch}$ may be configured by RRC signaling. Based on the smallest subcarrier spacing (SCS) (u) among SCSs of all DL BWPs configured for the capability and serving cell (or a set of serving cell) of the UE, the minimum $P_{switch}$ value may be defined as shown in [Table 1] below.

TABLE 1

| u | Minimum $P_{switch}$ value for UE processing capability 1 [symbols] | Minimum $P_{switch}$ value for UE processing capability 2 [symbols] |
|---|---|---|
| 0 | 25 | 10 |
| 1 | 25 | 12 |
| 2 | 25 | 22 |

(2) PDCCH Monitoring Skipping

In the current NR standards, PDCCH monitoring skipping has been defined to reduce the power consumption of the UE. The UE may be configured with a plurality of PDCCH monitoring skipping durations by an RRC parameter. In this case, the plurality of PDCCH monitoring skipping durations may be configured at the slot level. In addition, any one of the plurality of PDCCH monitoring skipping durations may be indicated to the UE in DCI, and the UE may skip PDCCH monitoring during the corresponding duration. On the other hand, the UE may be instructed not to perform PDCCH monitoring skipping (i.e., no PDCCH monitoring skipping) in the DCI indicating the PDCCH monitoring skipping duration. If PDCCH monitoring skipping for a specific period is indicated by a PDCCH monitoring adaptation field of DCI, the UE may perform the PDCCH monitoring skipping from the beginning of the first slot after the last symbol of PDCCH reception including the corresponding DCI.

(3) Combination of SS Set Group Switching and PDCCH Monitoring Skipping

When the UE is configured with a plurality of SS set groups and a plurality of PDCCH monitoring skipping durations through the RRC layer, and when the UE receives DCI including a PDCCH monitoring adaptation field, the UE may perform SS set group switching or PDCCH monitoring skipping according to the value of the corresponding PDCCH monitoring adaptation field.

For example, depending on whether a plurality of SS set groups are configured and/or whether a plurality of PDCCH monitoring skipping durations are configured, each configurable value of the PDCCH monitoring adaptation field may be mapped to one SS set group or one PDCCH monitoring skipping duration.

When the UE receives the PDCCH monitoring adaptation field, the UE may perform switching to an SS set group corresponding to the corresponding PDCCH monitoring adaptation field value or stop PDCCH monitoring during a PDCCH monitoring skipping duration corresponding to the corresponding PDCCH monitoring adaptation field value.

If the UE receives DCI including a PDCCH monitoring adaptation field indicating PDCCH monitoring skipping in a specific slot, the UE may not expect that a different value from the value of the PDCCH monitoring adaptation field included in the previously received DCI is indicated in the same specific slot.

In addition, if the UE receives DCI including a PDCCH monitoring adaptation field indicating SS set group switching in a specific slot, the UE may not expect that a different value from the value of the PDCCH monitoring adaptation field included in the DCI received in the specific slot is indicated in a slot at least before $P_{switch}$ symbols from the specific slot. That is, the UE may expect that a different value from the value of the PDCCH monitoring adaptation field included in the DCI received in the specific slot is indicated in a slot at least after the $P_{switch}$ symbols from the specific slot.

The embodiments described below may be applied to, for example, extended reality (XR). XR is a concept that encompasses augmented reality (AR), virtual reality (VR), and mixed reality (MR). According to the features of XR, the time when traffic is expected to be received is fixed by frame per second (FPS), and due to the effect of jitter, the expected reception time may be delayed or advanced. The jitter of XR traffic appears as a truncated Gaussian probability distribution. Therefore, the power saving effect may be expected by periodically configuring DRX according to FPS. In addition, if PDCCH monitoring adaptation is configured even though the DRX is not configured, the power saving effect may be expected only by the PDCCH monitoring adaptation. The power saving effect may be expected by configuring both the DRX and PDCCH monitoring adaptation.

The expected time of receiving traffic and the expected time of receiving in consideration of the effect of jitter may be expressed as a probability, and the following embodiments are applicable to achieve the power saving effect in the XR environment as described above.

As an example, as the probability of jitter decreases at a point in time that is relatively far from the expected time of receiving traffic, the reception probability decreases. Thus, the UE may sparsely monitor a PDCCH for power saving. On the other hand, as the probability of jitter increases at a point in time close to the expected time of receiving traffic, the reception probability increases. The UE may densely monitor the PDCCH to adjust the power consumption depending on the reception probability. To this end, an SS set group including SS sets for dense PDCCH monitoring may be set to SS set group #0, and an SS set group including SS sets for sparse PDCCH monitoring may be set to SS set group #1. In other words, the SS set group switching operation may be configured for XR in consideration of jitter.

As another example, the UE may perform PDCCH monitoring during a short period with a high probability of receiving traffic due to a high probability of jitter and then repeat a micro-sleep operation. Accordingly, when the UE does not normally receive traffic, the UE may expect the power saving effect by performing the micro-sleep operation quickly. Then, the UE may perform PDCCH monitoring to receive retransmitted traffic, thereby increasing the efficiency of the PDCCH monitoring. In other words, the PDCCH monitoring skipping operation may be configured for XR in consideration of jitter.

In Rel-18 NR standards, various scenarios and candidate technologies are being discussed to support XR services (e.g., FS_NR_XR_enh). In general, the XR service need to satisfy the following requirements: high data rate and low latency. In addition, since it is expected that the UE consumes high power, various techniques for power saving are being considered.

The traffic model and requirements of XR services are defined in 3GPP TR 38.838, which is the technical report of Rel-17 XR study. For the XR service, 60 FPS is generally required, and in some cases, 120 FPS is required. A frame in the XR traffic model may be understood to be the same as a packet received in communication environments. On the other hand, jitter may occur due to various causes, in addition to periodic occurrence of traffic. Here, jitter may mean that a packet is received earlier or later than a packet reception time at which actual packet reception is expected.

Figure 7:
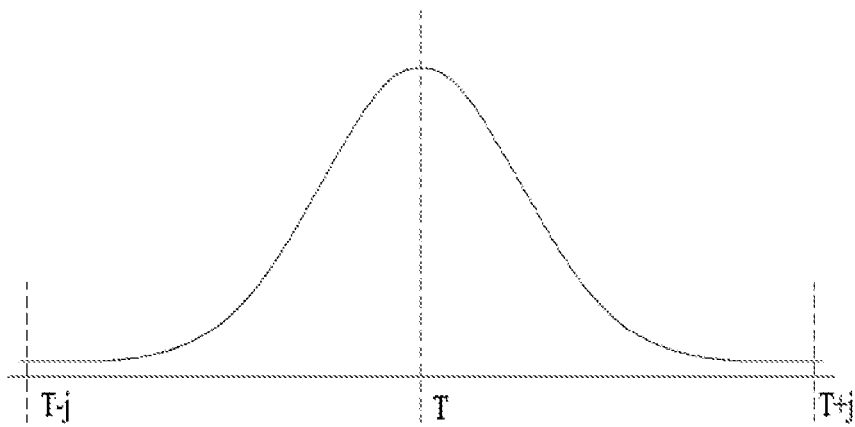
FIG. 7 is a diagram for explaining jitter that may occur when an extended reality (XR) packet is received.

In the traffic model of the XR service, it is assumed that jitter appears based on the truncated Gaussian distribution. For example, referring to FIG. 7, assuming that the periodic packet reception time is T, the range in which a packet is capable of actually being received is given by [T−j, T+j] (e.g., j=4). The closer to the time T, the higher the packet reception probability, and the farther from the time T, the lower the packet reception probability. In this case, the jitter range is [−j, j] (e.g., j=4), which may be the range generally assumed in a single stream DL traffic model. Therefore, it is necessary to design a system in consideration of jitter as well as periodic traffic transmission/reception in order to achieve the power saving effect based on the DRX operation in the XR service.

For power saving of UEs supporting XR services, the following operations: DRX and PDCCH monitoring adaptation may be considered.

The DRX used to reduce unnecessary power consumption of the UE in NR has the following features. A DRX structure for the UE in the RRC_IDLE state and a DRX structure for the UE in the RRC_CONNECTED state are defined separately. The two DRX structures are designed such that a duration in which the UE expects to receive a DL signal is periodically generated, thereby reducing unnecessary power consumption in other durations. In particular, for C-DRX (e.g., DRX applied to the UE in the RRC_CONNECTED state), the start position of the on-duration is periodically generated according to NR Rel-16 standards.

In this case, the size of the configurable cycle (e.g., DRX cycle) may be determined by a higher layer parameter provided by the BS to the UE.

The PDCCH monitoring adaptation operation may refer to an operation of adjusting the number of times that the UE performs PDCCH monitoring (generally, an operation of reducing the number of times of monitoring).

The UE may be configured with a maximum of 10 SS sets for each BWP. In addition, the UE may monitor PDCCH candidates included in the SS sets (hereinafter, SS set monitoring).

Since the UE needs to perform blind decoding (BD) for a PDCCH whose reception time and DCI format are unknown, the UE may consume much power for PDCCH monitoring.

As an example of the PDCCH monitoring adaptation, PDCCH monitoring skipping (hereinafter, skipping) and SS set group switching (hereinafter, switching) are considered. PDCCH monitoring skipping means stopping PDCCH monitoring for a predetermined duration (e.g., PDCCH monitoring skipping duration). The search space set group (SSSG) switching means dividing configured SS sets into a plurality of groups, indicating switching to one group among the plurality of groups according to the purpose of use, and then monitoring SS sets included in the corresponding group.

In the present disclosure, for convenience of description, SSSGs are divided into SSSG #0 and SSSG #1. Here, SSSG#0 refers to an SSSG including a relatively large number of SS sets or an SSSG including SS sets with relatively short periods in order to increase the number of times of PDCCH monitoring when the amount of expected data transmission is large. SSSG#1 is an SSSG including a relatively small number of SS sets or an SSSG including SS sets with relatively long periods in order to reduce the number of times of PDCCH monitoring for power saving.

That is, SSSG Switching means that the UE stops monitoring SS sets currently included in a specific SSSG and starts monitoring of SS sets included in other SSSGs.

The present disclosure proposes methods of indicating/configuring a PDCCH monitoring adaptation pattern and methods of performing PDCCH monitoring by the UE based on the PDCCH monitoring adaptation pattern to reduce power consumption by adjusting the number of times that the UE performs the PDCCH monitoring while receiving XR packets without any problems. Downlink control information (DCI) capable of indicating the methods proposed in the present disclosure may include scheduling DCI as well as DCI format 2_6, which may be used as a wake-up indication signal (WUS) of a DRX cycle. In addition, the methods proposed in the present disclosure may be indicated by non-scheduling DCI that has not been previously used and new DCI introduced for the proposed methods.

The present disclosure is described based on XR services, but the proposed methods are applicable to any communication services as long as periodic transmission is scheduled.

The present disclosure defines a PDCCH monitoring adaptation pattern indicating a duration in which the UE monitors a PDCCH, a duration in which the UE stops PDCCH monitoring, and/or a duration in which the UE reduces the frequency of PDCCH monitoring. In addition, the present disclosure proposes a method by which, when the UE is indicated/configured with a PDCCH monitoring adaptation pattern, the UE monitors a PDCCH according to the indicated/configured PDCCH monitoring adaptation pattern.

Stochastically, an XR packet may be received earlier or later than a fixed expected reception time due to the effect of jitter. Accordingly, the UE may monitor a PDCCH to receive the XR packet at a specific point in time. If no PDCCH is detected, the UE may reduce the number of times of PDCCH monitoring without missing the XR packet by repeating power saving operation in micro-sleep mode, which may be defined as a PDCCH monitoring pattern in the present disclosure. In addition, the present disclosure proposes a method of configured/indicating the PDCCH monitoring pattern.

In the present disclosure, both a case in which the DRX operation is configured for the UE to support XR services and a case in which no DRX operation is configured may be considered.

The methods proposed in the present disclosure will be described based on XR services where periodic reception is required, but the present disclosure is not limited thereto. In other words, it will be understand by people skilled in the art that the present disclosure is applicable to all signals received by the UE with a certain periodicity.

Thus, it is obvious that unless specified otherwise, the methods proposed in the present disclosure may be applied to all types of transmission/reception methods expected by the BS and the UE as long as the principles of the present disclosure are not violated. In this document, the term DRX is used as a general concept including the term C-DRX for description of convenience.

In addition, the present disclosure is described based on the NR system to explain the principles of the present disclosure, but the proposed methods are not limited to specific NR transmission/reception unless otherwise specified. Although the present disclosure is described based on the characteristics and structure of a UE supporting C-DRX to explain the principles of the present disclosure, the proposed methods are not specifically limited to the UE supporting C-DRX unless otherwise specified. Accordingly, it is obvious that unless specified otherwise, the methods proposed in the present disclosure are applicable to all structures and services for wireless communication transmission/reception as long as the principles of the present disclosure are not violated.

In the following description, each method or option may be intended to clarify the description, and it is not to be construed as implying that each method or option needs to be practiced independently. For example, each of the methods/options described below may be implemented separately, but at least some of the methods/options may be implemented in combination as long as the methods/options do not conflict with each other.

In the methods proposed in the present disclosure and descriptions thereof, a packet may mean a packet for XR services unless specified otherwise. The packet in the present disclosure may be a PDSCH related to traffic or a TB transmitted for the XR service.

Figure 8:
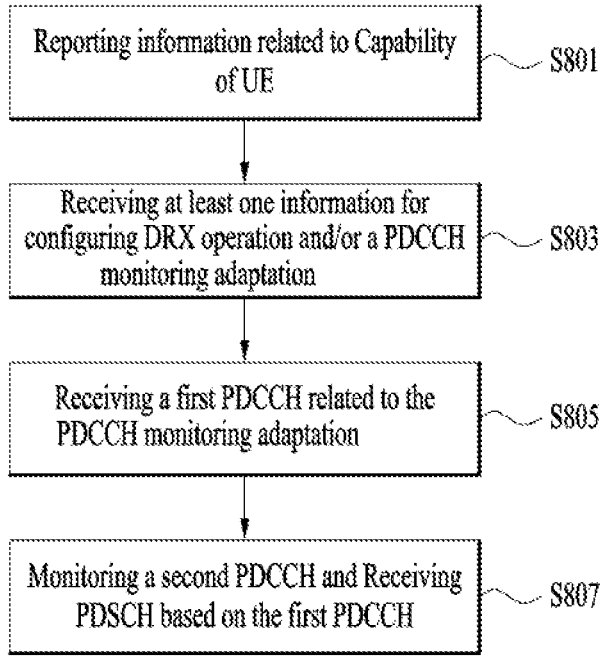
FIGS. 8 to 10 are diagrams for explaining overall operation processes of a user equipment (UE) and a base station (BS) according to [Method 1] of the present disclosure.
Figure 9:
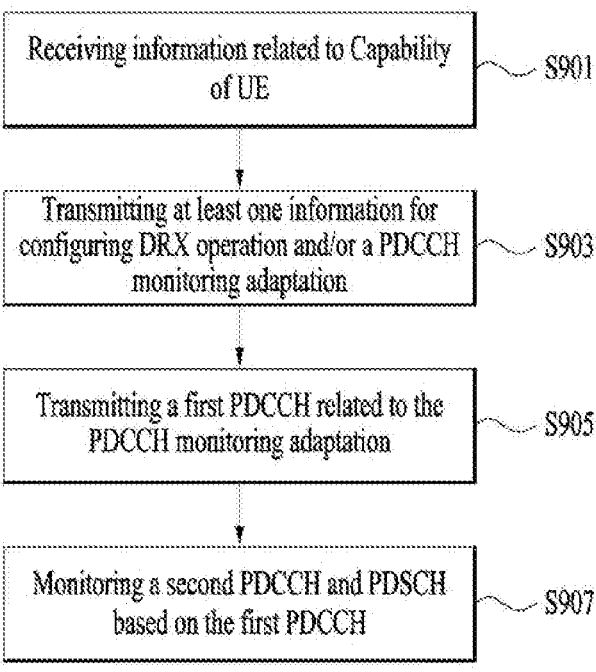
Figure 10:
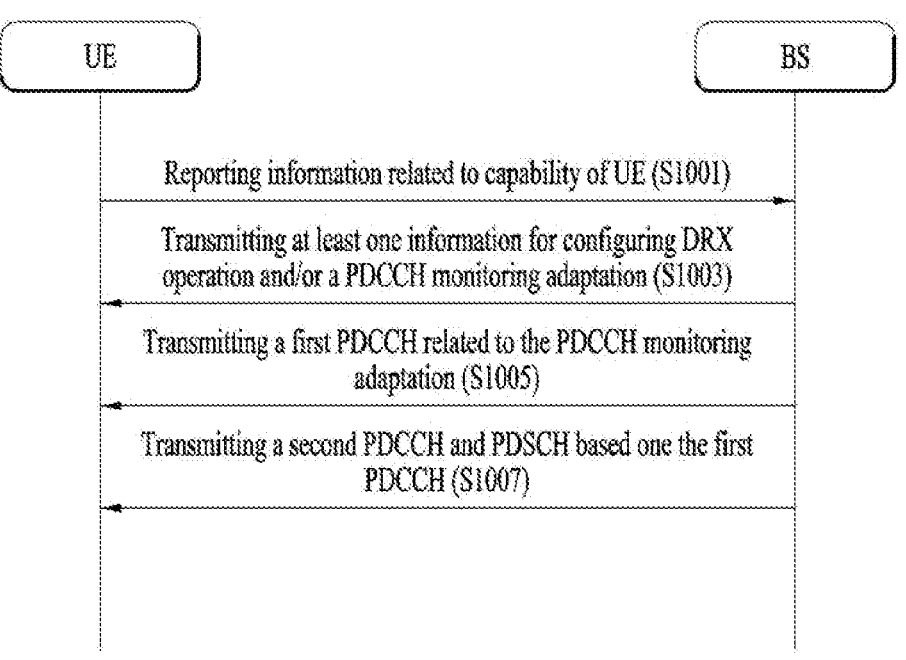

FIGS. 8 to 10 are diagrams for explaining overall operation processes of a UE and a BS according to [Method 1] of the present disclosure.

FIG. 8 illustrates the overall operation process of the UE according to [Method 1].

Referring to FIG. 8, the UE may report capability information including information on a PDCCH monitoring adaptation pattern to the BS (S801). In this case, the information on the PDCCH monitoring adaptation pattern may include whether PDCCH monitoring adaptation such as PDCCH monitoring skipping and search space set group (SSSG) switching is supported.

The UE may receive at least one piece of information on a DRX operation and/or PDCCH monitoring adaptation pattern determined based on the capability information on the UE and/or the PDCCH monitoring adaptation pattern for supporting XR services (S803). In this case, the at least one piece of information may be received in higher layer signaling (e.g., RRC signaling) and/or over a PDCCH.

The UE may receive a first PDCCH related to the PDCCH monitoring adaptation pattern (S805). The UE may monitor a second PDCCH based on the first PDCCH and receive a PDSCH (e.g., XR packet) (S807). When only one PDCCH monitoring adaptation pattern is configured in step S803, step S805 may be omitted, and the second PDCCH may be monitored based on the PDCCH monitoring adaptation pattern configured in step S803. Upon detecting the second PDCCH, the UE may receive the PDSCH (e.g., XR packet) based on the second PDCCH.

Specific operations in steps S803 to S807 may be based on [Method 1-1] and/or [Method 1-2]. Based on the operations, the UE may reduce power consumption by reducing the number of times that PDCCH monitoring is unnecessarily performed while normally receiving scheduled XR packets.

FIG. 9 illustrates the overall operation process of the BS according to [Method 1].

Referring to FIG. 9, the BS may receive capability information including information on a PDCCH monitoring adaptation pattern from the UE (S901). In this case, the information on the PDCCH monitoring adaptation pattern may include whether PDCCH monitoring adaptation such as PDCCH monitoring skipping and SSSG switching is supported.

The BS may determine a DRX operation and/or PDCCH monitoring adaptation pattern based on the capability information on the UE and/or the PDCCH monitoring adaptation pattern for supporting XR services. In addition, the BS may transmit at least one piece of information on the determined DRX operation and/or PDCCH monitoring adaptation pattern (S903). In this case, the at least one piece of information may be transmitted through higher layer signaling (e.g., RRC signaling) and/or over a PDCCH.

The BS may transmit a first PDCCH related to the PDCCH monitoring adaptation pattern (S905). The BS may transmit a second PDCCH and a PDSCH (e.g., XR packet) based on the first PDCCH (S907). When only one PDCCH monitoring adaptation pattern is configured in step S903, step S905 may be omitted, and the second PDCCH may be transmitted based on the PDCCH monitoring adaptation pattern configured in step S903. The BS may transmit the PDSCH (e.g., an XR packet) based on the second PDCCH.

Specific operations in steps S903 to S907 may be based on [Method 1-1] and/or [Method 1-2]. Based on the operations, the BS may reduce power consumption by reducing the number of times that PDCCH transmission is unnecessarily performed while normally transmitting scheduled XR packets.

FIG. 10 illustrates the overall operating process of the network according to [Method 1].

Referring to FIG. 10, the UE may report capability information including information on a PDCCH monitoring adaptation pattern to the BS (S1001). In this case, the information on the PDCCH monitoring adaptation pattern may include whether PDCCH monitoring adaptation such as PDCCH monitoring skipping and SSSG switching is supported.

The BS may determine a DRX operation and/or PDCCH monitoring adaptation pattern based on the capability information on the UE and/or the PDCCH monitoring adaptation pattern for supporting XR services. In addition, the BS may transmit at least one piece of information on the determined DRX operation and/or PDCCH monitoring adaptation pattern (S1003). In this case, the at least one piece of information may be transmitted through higher layer signaling (e.g., RRC signaling) and/or over a PDCCH.

The BS may transmit a first PDCCH related to the PDCCH monitoring adaptation pattern (S1005). The BS may transmit a second PDCCH and a PDSCH (e.g., XR packet) based on the first PDCCH. The UE may monitor the second PDCCH based on the first PDCCH and receive the PDSCH (e.g., XR packet) (S1007). When only one PDCCH monitoring adaptation pattern is configured in step S1003, step S1005 may be omitted, and the second PDCCH may be transmitted based on the PDCCH monitoring adaptation pattern configured in step S1003. The BS may transmit the PDSCH (e.g., an XR packet) based on the second PDCCH.

Specific operations in S1003 to S1007 may be based on [Method 1-1] and/or [Method 1-2]. Based on the operations, the BS and UE may reduce power consumption by reducing the number of times that PDCCH transmission is unnecessarily performed while normally transmitting and receiving scheduled XR packets.

[Method 1] Method of Configuring/Indicating PDCCH Monitoring Adaptation Pattern to UE Configured with DRX The UE may be configured with a PDCCH monitoring adaptation pattern after the start of drx-onDurationTimer. The PDCCH monitoring adaptation pattern may be indicated by a WUS or DCI that may be detected at the same or similar time point as the time point at which the WUS is detected. For example, the PDCCH monitoring adaptation pattern may be indicated by DCI detected in a monitoring occasion (for example, DCP (DCI format 2_6 with CRC scrambled by PS-RNTI occasion)) capable of detecting the WUS or DCI received within a certain period (e.g., x ms or y symbols) from the monitoring occasion. In addition, after a DRX active time starts, the PDCCH monitoring adaptation pattern may be indicated by scheduling DCI, new DCI formats, etc.

Alternatively, it may be predetermined by a higher layer configuration that the PDCCH monitoring adaptation pattern is performed simultaneously with the start of the DRX active time.

Figure 11:
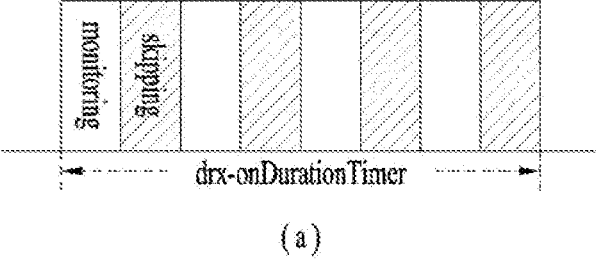
FIGS. 11 and 12 are diagrams for explaining examples of [Method 1] of the present disclosure.
Figure 11:
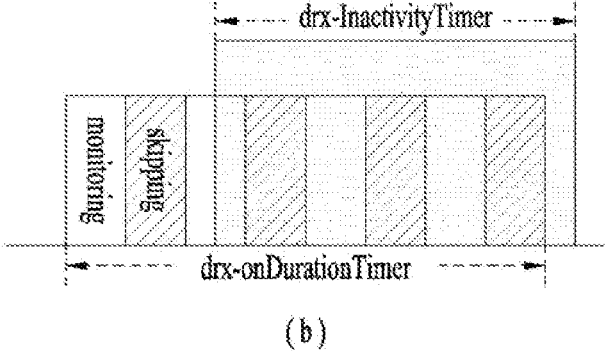
Figure 11:
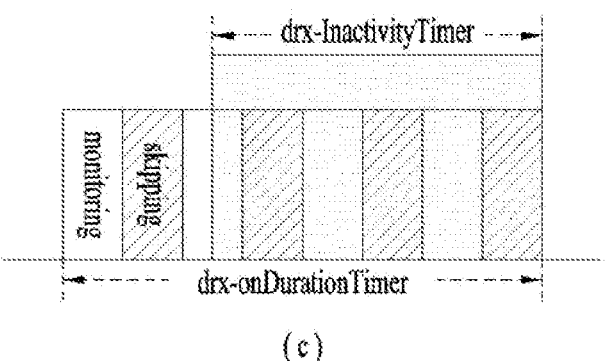

[Method 1-1] PDCCH Monitoring Adaptation Pattern including PDCCH Monitoring Skipping The UE may be instructed to start drx-onDurationTimer and monitor a PDCCH according to a PDCCH monitoring adaptation pattern including PDCCH monitoring skipping. For example, referring to FIG. 11(a), the PDCCH monitoring adaptation pattern may refer to an operation of repeatedly performing PDCCH monitoring and PDCCH monitoring skipping at regular intervals. In terms of PDCCH monitoring performed by the UE, this may be similar to repeatedly starting a short DRX active time. The difference therebetween is that the micro-sleep mode of the UE is guaranteed by the indication of the PDCCH monitoring adaptation while the DRX active time continues rather than that the PDCCH monitoring of the UE is controlled by a DRX timer. FIG. 11(a) schematically illustrates an exemplary PDCCH monitoring adaptation pattern.

Since the PDCCH monitoring adaptation pattern is known to the BS and UE in common, the BS may transmit an XR packet and/or a PDCCH scheduling the XR packet at a time at which the UE performs PDCCH monitoring. If the UE detects no PDCCH within a short PDCCH monitoring duration, the UE may repeatedly skip the PDCCH monitoring in order to reduce the number of times of that the UE performs the PDCCH monitoring within the entire DRX active time, thereby achieving the effect of saving the power of the UE.

(1) UE Operation at Start of DRX Active Time

After drx-onDurationTimer starts, the UE may monitor a PDCCH for a predetermined duration (hereinafter referred to as a first duration). The UE may skip PDCCH monitoring for another predetermined duration (hereinafter referred to as a second duration) after the corresponding predetermined duration. In addition, as shown in FIG. 11(a), the UE may repeatedly perform an operation of perform the PDCCH monitoring during the first duration and skipping the PDCCH monitoring during the second duration. The above-described first and second durations may be configured in time units such as ms, slots, or symbols, or the first and second durations may be set as a ratio to the entirety of drx-onDurationTimer.

(2) UE Operation when PDCCH is Detected in PDCCH Monitoring Duration (First Duration)

Operations when the UE detects a PDCCH in a PDCCH monitoring duration may be classified into five types. The operations may be applied independently or in combination.

1) Referring to FIG. 11(a), when the UE detects a PDCCH, drx-InactivityTimer may start. For the duration of drx-InactivityTimer, the UE may always monitor the PDCCH without performing PDCCH monitoring skipping. In other words, while drx-onDurationTimer is running, the UE may monitor the PDCCH according to an indicated/configured PDCCH monitoring adaptation pattern. While drx-InactivityTimer is running, the UE may always monitor the PDCCH. For a duration in which drx-InactivityTimer and drx-onDurationTimer overlap, the UE may prioritize the operation based on drx-InactivityTimer. For example, for the duration in which drx-InactivityTimer and drx-onDurationTimer overlap, the UE may always monitor the PDCCH.

2) Referring to FIG. 11(b), when the UE detects a PDCCH, drx-InactivityTimer may start. For the duration of drx-InactivityTimer, the UE may always monitor the PDCCH without performing PDCCH monitoring skipping. The duration of drx-InactivityTimer may be configured in consideration of the remaining duration of drx-onDurationTimer. For example, if drx-onDurationTimer is 8 ms and a time point at which the UE detects the PDCCH is 3 ms, the duration of drx-InactivityTimer may be set to 5 ms. In terms of the entirety of DRX, drx-InactivityTimer may start in the middle of drx-onDurationTimer, and drx-onDuration-Timer and drx-InactivityTimer may end at the same time.

3) The UE may not be configured with drx-Inactivity-Timer. After detecting a PDCCH, the UE may always perform PDCCH monitoring during the remaining duration of drx-onDurationTimer without skipping the PDCCH monitoring. That is, in terms of the PDCCH monitoring of the UE, operation 3) may be the same as operation 2), but there may be a difference in timer configurations for implementation.

4) When the UE detects a PDCCH, the UE may perform PDCCH monitoring skipping at the end of the current DRX cycle or during the rest of the DRX active time.

5) When the UE detects a PDCCH, drx-InactivityTimer may start. The UE may monitor the PDCCH during the duration of drx-InactivityTimer according to PDCCH monitoring adaptation indicated by the detected PDCCH. If there is no special indication, the UE may perform normal PDCCH monitoring. In addition, for a duration in which drx-InactivityTimer and drx-onDurationTimer overlap, the UE may be instructed/configured to prioritize one of the two timers.

Each of operations 1) to 5) described above has advantages and disadvantages in terms of power consumption due to PDCCH monitoring of the UE and reception of additional XR packets at the current DRX cycle.

For operation 1), it may be the same as the normal DRX timer operation configured for NR UEs. In this case, drx-InactivityTimer may be used to guarantee a predetermined PDCCH monitoring skipping duration to the UE after the UE receives DCI scheduling XR packets.

For operations 2) and 3), even if the UE detects a PDCCH, the UE may be configured with a predetermined PDCCH monitoring skipping duration without increasing the length of the DRX active time. Considering that XR traffic is supposed to be periodically transmitted, the purposes of operations 2) and 3) may be to reduce power consumption by skipping PDCCH monitoring and terminating the DRX active time until the next cycle after reception of XR traffic. In this case, it may be assumed that there is no problems even if packets other than XR packets are transmitted after being delayed until the next DRX cycle.

For operation 4), since the UE completely receives XR packets, which is the purpose of the current DRX cycle, the UE may stop PDCCH monitoring within the corresponding DRX cycle after receiving the XR packets. In this case, the power saving effect may be maximized, and packets other than XR packets may be transmitted after being delayed until the next DRX cycle as described above in operation 3).

For operation 5), during the duration of drx-Inactivity-Timer, the UE may perform normal PDCCH monitoring and PDCCH monitoring adaptation within the DRX active time, instead of operating based on a PDCCH monitoring adaptation pattern within the DRX active time. The UE may perform PDCCH monitoring according to priorities in a duration in which drx-InactivityTimer and drx-onDuration-Timer overlap. For example, if drx-onDurationTimer takes precedence, the UE may perform PDCCH monitoring according to a PDCCH monitoring adaptation pattern during the overlapping duration. On the other hand, if drx-Inactivi-tyTimer takes precedence, the UE may always perform PDCCH monitoring during the overlapping duration or perform PDCCH monitoring adaptation indicated by a PDCCH, which triggers drx-InactivityTimer, during the overlapping duration.

(3) Configuration Examples

As described above in FIG. 7, jitter may occur according to the truncated Gaussian distribution. Accordingly, the actual reception time of an XR packet may be probabilistically determined from the expected reception time. In order to reduce power consumption, the UE may perform PDCCH monitoring in a specific range in which the UE is capable of receiving XR packets rather than in all ranges in which the UE is capable of receiving XR packets.

For example, the first PDCCH monitoring duration of FIG. 11(a) may be determined according to the above-described truncated Gaussian distribution. In other words, the length of the corresponding PDCCH monitoring duration may be determined in consideration of the size of jitter in the XR traffic model. If the UE detects no PDCCH in the first PDCCH monitoring duration, the UE may stop PDCCH monitoring to reduce power consumption. If the UE detects a PDCCH in the PDCCH monitoring duration, the UE may receive a scheduled PDSCH. Then, the UE may end the procedure by transmitting a HARQ-ACK in response to the PDSCH. When the BS fails to receive the HARQ-ACK, the BS may know that the BS transmits an XR packet but the UE fails to receive the XR packet in the PDCCH monitoring duration. Accordingly, the BS may determine the length of a PDCCH monitoring skipping duration in consideration of a scheduling offset, a HARQ-ACK timing, and/or a HARQ round trip time (RTT).

The BS may configure to the UE a PDCCH monitoring adaptation pattern, which is configured with the length of a PDCCH monitoring duration and the length of a PDCCH monitoring skipping duration, to allow the UE to perform PDCCH monitoring according to the PDCCH monitoring adaptation pattern simultaneously with the start of the DRX active time.

Alternatively, the BS may configure a plurality of PDCCH monitoring adaptation patterns through RRC signaling and/or MAC signaling and then indicate one of the patterns to the UE in DCI. When the plurality of PDCCH monitoring adaptation patterns are configured, the UE may be indicated with one PDCCH monitoring adaptation pattern including the length of one or more PDCCH monitoring durations and the length of one or more PDCCH monitoring skipping durations in a WUS (or DCI similar thereto). For example, the UE may be configured with a PDCCH monitoring adaptation pattern including a relatively long PDCCH monitoring duration and a relatively short PDCCH monitoring duration. When the UE requires power saving, the BS may configure the PDCCH monitoring adaptation pattern with the short PDCCH monitoring duration for other durations except for a duration in which the transmission probability at the expected time of receiving XR packets is higher than a predetermined value. When the UE needs to accurately receive XR packets, the BS may configure the PDCCH monitoring adaptation pattern with the long PDCCH monitoring duration for the other durations except for the duration in which the transmission probability at the expected time of receiving XR packets is higher than the predetermined value.

Alternatively, the PDCCH monitoring adaptation pattern of the UE may be fixed, and only the wake-up indication may be indicated in a WUS. That is, the PDCCH monitoring adaptation pattern may be fixed, and whether the corresponding PDCCH monitoring adaptation pattern is applied may be indicated to the UE through the wake-up indication. In this case, the wake-up indication may indicate a PDCCH monitoring duration in which the UE needs to wake up within the DRX cycle, instead of indicating that the UE needs to wake up during the entire DRX cycle (the duration may be represented in units of ms, slots, or symbols).

According to [Method 1-1], the PDCCH monitoring adaptation pattern may be applied based on the duration of the DRX active time, which is determined by the DRX configuration, and thus, the UE may increase the effect of power saving while efficiently receiving XR packets. In addition, the PDCCH monitoring duration and PDCCH monitoring skipping duration may be appropriately adjusted according to the necessity for XR packet scheduling of the BS, and thus, both power saving and traffic reception stability may be achieved. Since the PDCCH monitoring adaptation may be indicated by a pattern, the PDCCH monitoring adaptation with a long duration may be changed by a single indication, thereby improving the efficiency of signaling.

[Method 1-2] PDCCH Monitoring Adaptation Pattern including SSSG Switching

Figure 12:
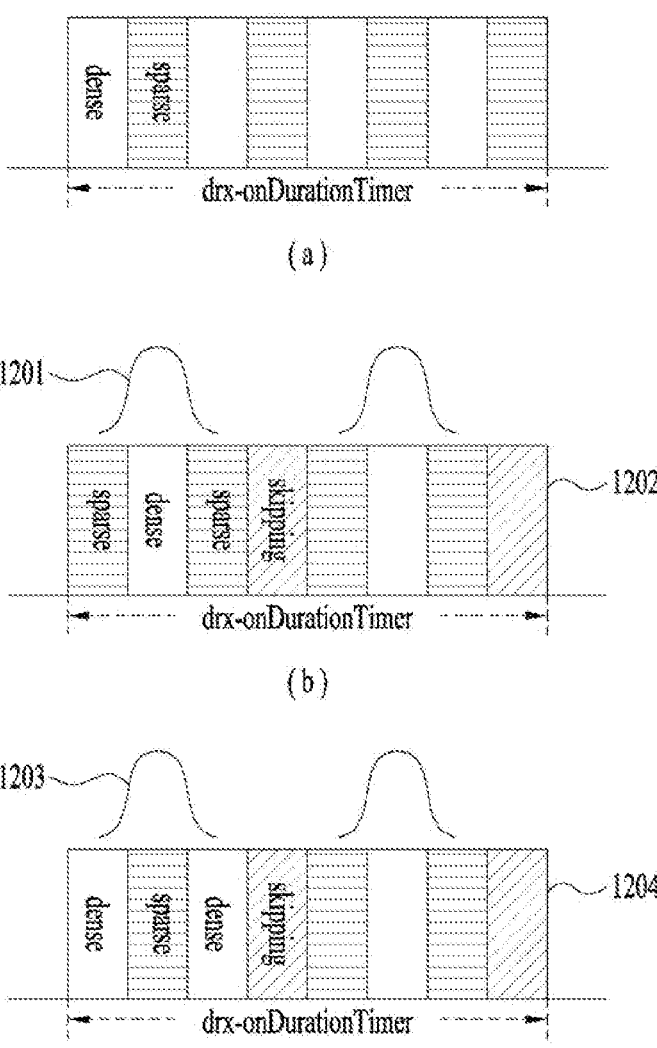

The UE may be instructed to start drx-onDurationTimer and monitor a PDCCH according to a PDCCH monitoring adaptation pattern including SSSG switching. For example, referring to FIG. 12(a), when the UE is configured with two SSSGs, the UE may be configured with a sparse SSSG (i.e., an SSSG with a low PDCCH monitoring frequency) and a dense SSSG (i.e., an SSSG with a high PDCCH monitoring frequency). FIG. 12(a) shows that switching between the sparse SSSG and dense SSSG is repeated as an exemplary PDCCH monitoring adaptation pattern. In terms of the PDCCH monitoring of the UE, it may be interpreted to mean that only the PDCCH monitoring frequency varies at regular intervals during the DRX active time.

As another example, as shown in FIGS. 12(b) and 12(c), a PDCCH monitoring adaptation pattern including SSSG switching and PDCCH monitoring skipping may be configured. Referring to FIG. 12(b), the UE may repeat sparse SSSG monitoring, dense SSSG monitoring, sparse SSSG monitoring, and PDCCH monitoring skipping. In this case, the SSSG switching and PDCCH monitoring skipping may be configured by an SSSG switching timer and a PDCCH monitoring skipping duration, respectively. In the Rel-17 NR standards, since no timer is configured for SSSG#0, a timer may be additionally defined and configured for SSSG#0.

In FIG. 12(b), the curve 1201 shows the truncated Gaussian distribution of jitter (e.g., the reception probability distribution of XR packets) for reference. The UE may perform sparse PDCCH monitoring in a duration with a low jitter probability based on the PDCCH monitoring adaptation pattern. The UE may perform dense PDCCH monitoring in a duration with a high jitter probability and then perform PDCCH monitoring skipping (1202). Accordingly, the UE may accurately receive XR packets and maximize the power saving effect by performing efficient PDCCH monitoring.

Referring to FIG. 12(c), the UE may perform dense PDCCH monitoring in a duration with a low jitter probability and perform sparse PDCCH monitoring in a duration with a high jitter probability, contrary to the example of FIG. 12(b). Since the UE is highly expected to detect no PDCCH in a duration where the probability of receiving XR packets is low, the PDCCH monitoring adaptation pattern may be configured so that the UE performs a lot of PDCCH monitoring.

(1) UE Operation at Start of DRX Active Time

The UE may start drx-onDurationTimer and perform PDCCH monitoring in a sparse SSSG or dense SSSG. If the UE detect no PDCCH until drx-onDurationTimer expires, the UE may switch to a later SSSG or perform PDCCH monitoring skipping according to a PDCCH monitoring adaptation pattern. An SSSG switching timer or PDCCH monitoring skipping duration may be configured in time units such as ms, slots, or symbols. Alternatively, the SSSG switching timer or PDCCH monitoring skipping duration may be set as a ratio to the entirety of drx-onDurationTimer.

(2) UE Operation upon Detecting PDCCH in PDCCH Monitoring Duration

Operations when the UE detects a PDCCH in a dense SSSG monitoring duration or a sparse SSSG monitoring duration may be classified into five types. The operations may be applied independently or in combination. In addition, the operations may be commonly applied regardless of the above-described PDCCH monitoring adaptation patterns.

1) If the UE detects a PDCCH, the UE may reset a timer related to the currently monitored SSSG. This may be based on SSSG switching defined in the Rel-17 standard. In addition, when the reset timer expires, the UE may perform next scheduled operations according to a PDCCH monitoring adaptation pattern.

2) After the UE detects a PDCCH for the first time within the DRX active time, the UE may terminate a configured/indicated PDCCH monitoring adaptation pattern and then switch to normal PDCCH monitoring in DRX. That is, after switching to a dense SSSG or sparse SSSG with no timers, the UE may perform SSSG switching based on a timer.

3) Even if the UE detects a PDCCH, the UE may not reset a timer related to the SSSG currently monitored by the UE. That is, the UE may continue to count the current timer. In other words, the UE continues to run the timer as long as the remaining duration at the time of detecting the PDCCH. Thereafter, when the timer expires, the UE may perform next operations according to a PDCCH monitoring adaptation pattern.

4) If the UE detects a PDCCH, the UE may switch to a sparse SSSG. If the UE is currently monitoring the sparse SSSG, the UE may reset a timer. Then, when the timer for the sparse SSSG expires, the UE may perform PDCCH monitoring skipping. That is, the UE may perform SSSG switching and PDCCH monitoring skipping in a direction in which the PDCCH monitoring frequency decreases (i.e., dense SSSG 4 sparse SSSG 4 PDCCH monitoring skipping). However, if detected DCI is not for scheduling XR traffic, the UE may perform SSSG switching in a direction in which the PDCCH monitoring frequency increases (i.e., PDCCH monitoring skipping 4 sparse SSSG 4 dense SSSG). The reason for this is that since the UE fails to receive XR packets that the UE desires to receive, the UE may increase the PDCCH monitoring frequency in order to receive the XR packets within a corresponding PDCCH monitoring duration.

5) If PDCCH monitoring adaptation is indicated in scheduling DCI, the corresponding indication may take precedence over all operations.

Each of operations 1) to 5) described above has advantages and disadvantages in terms of power consumption due to PDCCH monitoring of the UE and reception of additional XR packets at the current DRX cycle. In general, operations based on a PDCCH monitoring adaptation pattern may be performed independently of timers, and as the DRX active time increases, the operations based on the PDCCH monitoring adaptation pattern may be repeated.

According to operation 1), the UE may perform an SSSG switching operation defined in Rel-17 while following an indicated PDCCH monitoring adaptation pattern. For example, when the timer for SSSG switching expires, the UE may perform next operations based on the PDCCH monitoring adaptation pattern, instead of switching to a default SSSG.

According to operation 2), the UE may perform operations based on a PDCCH monitoring adaptation pattern before detecting a PDCCH for the first time in order to reduce power consumption. After detecting the PDCCH, the UE may perform DRX operations defined in the current NR standards. If the PDCCH is DCI scheduling XR packets, subsequent DRX operations may be to receive packets other than the XR packets. In this case, a DRX timer such as drx-InactivityTimer may be set relatively short for power saving.

According to operation 3), the UE may always perform operations based on a PDCCH monitoring pattern regardless of PDCCH detection. In this case, drx-InactivityTimer may not be configured. In addition, drx-onDurationTimer may be configured in consideration of a packet delay budget of XR traffic (or XR traffic model).

According to operation 4), subsequent SSSG switching operations may be determined depending on a PDCCH detected by the UE. In general, if the UE detects DCI related to reception of XR packets, the UE may determine that XR packets expected in the current DRX cycle is completely received. Accordingly, the UE may perform SSSG switching for power saving. In this case, the UE may gradually reduce the frequency of PDCCH monitoring in order to receive potential packets other than the XR packets, instead of immediately stopping the PDCCH monitoring. If the detected PDCCH is not related to XR packets, the UE may perform switching in a direction in which the PDCCH monitoring frequency increases in order to receive the XR packets expected in the current DRX cycle.

The UE may check a MAC PDU based on PDSCH reception to know whether the detected DCI is related to XR packets. In addition, the time required for the UE to perform SSSG switching may be represented by the number of symbols or slots, and the corresponding time may be used as an application delay of SSSG switching. Therefore, if the DCI includes indications other than PDCCH monitoring adaptation indications such as the SSSG switching, the UE may know that the DCI is not for XR packet scheduling without receiving the PDSCH. For example, if the DCI includes indications such as BWP switching and/or SCell dormancy indicators, the UE may recognize that the DCI is not for XR packet scheduling.

Operation 5) may be UE operations when a PDCCH monitoring adaptation indication is included in received DCI. Considering that the BS transmits the PDCCH monitoring adaptation indication in scheduling DCI, the dynamic indication in the scheduling DCI may take precedence over previous PDCCH monitoring adaptation indications/configurations.

(3) Configuration Examples

As described above, jitter may occur according to the truncated Gaussian distribution. Accordingly, the reception time of an XR packet may be probabilistically determined from the expected reception time. In order to reduce power consumption, different PDCCH monitoring frequencies may be configured by distinguishing a range having a relatively high reception probability and a range having a relatively low reception probability rather than for all ranges where the UE is capable of receiving XR packets.

In the example of FIG. 12(b) or 12(c), an application delay of SSSG switching may need to be considered. The application delay of SSSG switching may be set to a minimum of one slot or a maximum of two or three slots. Therefore, for a PDCCH monitoring adaptation pattern to be applied simultaneously with the start of the DRX active time, the timer for SSSG switching may be configured in consideration of the application delay.

Referring to the example of FIG. 12(b), a PDCCH monitoring adaptation pattern may be configured in consideration of the probability distribution of jitter as described above. The probability of jitter may be divided into two ranges. Specifically, dense PDCCH monitoring may be configured in a range where the probability of jitter is high, and sparse PDCCH monitoring may be configured in a range where the probability of jitter is low. Accordingly, the UE may consume power in a range where reception of many XR packets is expected, and the UE may reduce power consumption in a range in which reception of small XR packets is expected. If the UE detects a PDCCH, subsequent operations may be performed according to the above-described examples.

The BS may configure a PDCCH monitoring adaptation pattern to the UE in order to instruct the UE to monitor a PDCCH according to the corresponding PDCCH monitoring adaptation pattern simultaneously with the start of the DRX active time. The BS may configure a plurality of PDCCH monitoring adaptation patterns and indicate one of the PDCCH monitoring adaptation patterns in DCI. When the plurality of PDCCH monitoring adaptation patterns are configured, the UE may be indicated with a PDCCH monitoring adaptation pattern to perform PDCCH monitoring in a WUS (or DCI similar thereto). For example, when the UE requires power saving, the BS may indicate to the UE a PDCCH monitoring adaptation pattern in which the durations of sparse PDCCH monitoring and PDCCH monitoring skipping are set long and the duration of dense PDCCH monitoring is set short. When the UE needs to accurately receive XR packets, the BS may indicate to the UE of a PDCCH monitoring adaptation pattern in which the duration of dense PDCCH monitoring is set long and the durations of sparse PDCCH monitoring and PDCCH monitoring skipping are set short.

SSSG switching may be minimized within a PDCCH monitoring adaptation pattern by considering the application delay of the SSSG switching. For example, the PDCCH monitoring adaptation pattern may be configured such that the UE may perform SSSG switching once to sparse PDCCH monitoring after performing dense PDCCH monitoring at the start of the DRX active time. Alternatively, the PDCCH monitoring adaptation pattern may be configured such that the UE may perform SSSG switching once to dense PDCCH monitoring after performing sparse PDCCH monitoring. In addition, the BS may configure the above-described two PDCCH monitoring adaptation patterns to the UE. Then, the BS may indicate to the UE one of the two PDCCH monitoring adaptation patterns in DCI such as a WUS. In this case, the PDCCH monitoring adaptation pattern to be indicated in the DCI may be determined based on the occurrence of jitter or the delay of XR packets.

According to [Method 1-2], the frequency of PDCCH monitoring may be adjusted based on the probability of jitter, and thus, the UE may stably receive periodically transmitted XR packets while minimizing power for receiving the XR packets. A PDCCH monitoring adaptation pattern may be adjusted depending on which is more important: the need for XR packet reception or the power consumption of the UE, thereby enabling the PDCCH monitoring and XR packet reception depending on the purpose. In addition, since a plurality of PDCCH monitoring adaptation operations are capable of being indicated by one indication, it may be efficient in terms of signaling.

Figure 13:
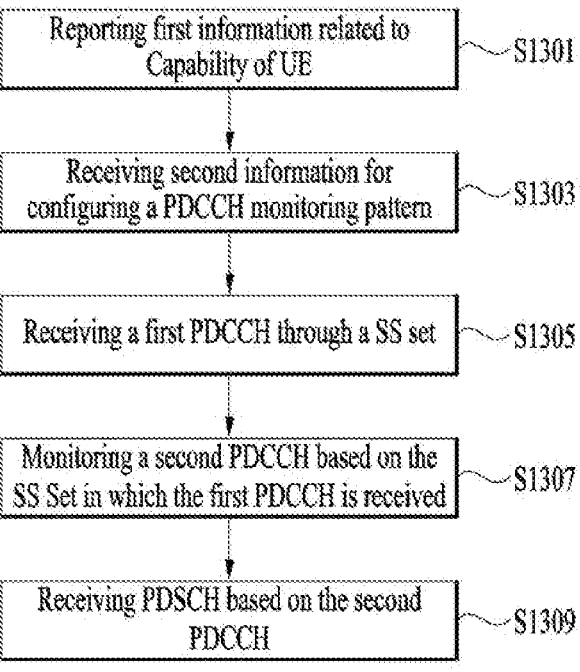
FIGS. 13 to 15 are diagrams for explaining overall operation processes of a UE and a BS according to [Method 2] of the present disclosure.
Figure 14:
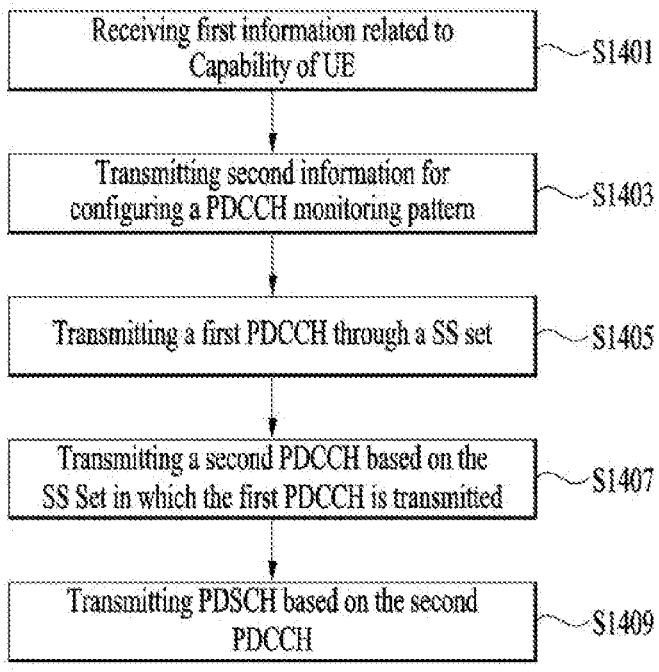
Figure 15:
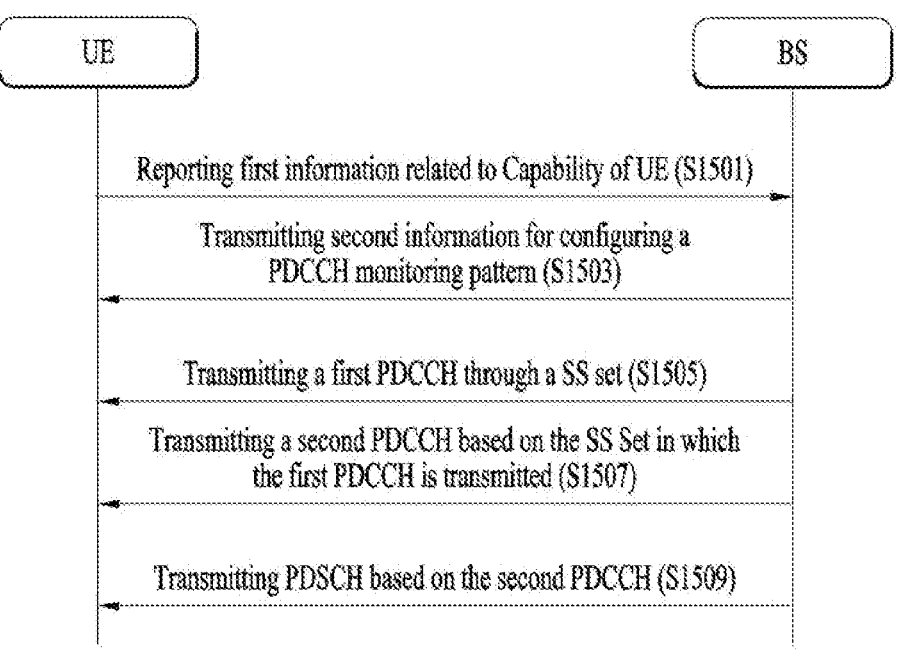

FIGS. 13 to 15 are diagrams for explaining processes for indicating an operation of reducing power consumption. Specifically, the BS may indicate a PDCCH monitoring pattern to the UE that is not configured with the DRX operation, and the UE may receive XR packets based on the PDCCH monitoring pattern.

FIG. 13 is a diagram for explaining the overall operation process of the UE according to [Method 2] of the present disclosure.

Referring to FIG. 13, the UE may report first information on the capability of the UE including information on a PDCCH monitoring pattern to the BS (S1301). In this case, the information on the PDCCH monitoring pattern may include information on whether PDCCH monitoring adaptation operations such as PDCCH monitoring skipping and SSSG switching are supported.

The UE may receive second information for configuring a PDCCH monitoring pattern from the BS (S1303). In this case, the second information may be determined in consideration of the first information on the capability of the UE, information on whether the UE supports XR services, and/or the PDCCH monitoring pattern supported by the UE. For example, the PDCCH monitoring pattern may be based on FIG. 16 and examples thereof, which will be described later.

The UE may receive a first PDCCH in at least one XR SS set (S1305). The UE may monitor a second PDCCH based on the at least one XR SS set according to the PDCCH monitoring pattern (S1307). The UE may receive a PDSCH (e.g., XR packet) based on the second PDCCH (S1309). Specific operations in S1303 to S1309 may be based on at least one of [Method 2-1] to [Method 2-3]. In addition, when a PDCCH monitoring adaptation operation is indicated in DCI included in the first PDCCH, the UE may perform PDCCH monitoring based on the PDCCH monitoring adaptation operation or according to a predetermined PDCCH monitoring pattern. Accordingly, the UE may reduce power consumption by reducing unnecessary PDCCH monitoring while normally receiving scheduled XR packets.

FIG. 14 is a diagram for explaining the overall operation process of the BS according to [Method 2] of the present disclosure.

Referring to FIG. 14, the BS may receive first information on the capability of the UE including information on a PDCCH monitoring pattern (S1401). In this case, the information on the PDCCH monitoring pattern may include information on whether PDCCH monitoring adaptation operations such as PDCCH monitoring skipping and SSSG switching are supported.

The BS may transmit second information for configuring a PDCCH monitoring pattern (S1403). In this case, the second information may be determined in consideration of the first information on the capability of the UE, information on whether the UE supports XR services, and/or the PDCCH monitoring pattern supported by the UE. For example, the PDCCH monitoring pattern may be based on FIG. 16 and examples thereof, which will be described later.

The BS may transmit a first PDCCH in at least one XR SS set (S1405). The BS may transmit a second PDCCH based on the at least one XR SS set according to the PDCCH monitoring pattern (S1407). The BS may transmit a PDSCH (e.g., XR packet) based on the second PDCCH (S1409). Specific operations in S1403 to S1409 may be based on at least one of [Method 2-1] to [Method 2-3]. In addition, when a PDCCH monitoring adaptation operation is indicated in DCI included in the first PDCCH, the UE may perform PDCCH monitoring based on the PDCCH monitoring adaptation operation or according to a predetermined PDCCH monitoring pattern. Accordingly, the UE may reduce power consumption by reducing unnecessary PDCCH monitoring while normally receiving scheduled XR packets.

FIG. 15 is a diagram for explaining the overall operation process of the network according to [Method 2] of the present disclosure.

Referring to FIG. 15, the UE may report first information on the capability of the UE including information on a PDCCH monitoring pattern to the BS (S1501). In this case, the information on the PDCCH monitoring pattern may include information on whether PDCCH monitoring adaptation operations such as PDCCH monitoring skipping and SSSG switching are supported.

The BS may transmit second information for configuring a PDCCH monitoring pattern (S1503). In this case, the second information may be determined in consideration of the first information on the capability of the UE, information on whether the UE supports XR services, and/or the PDCCH monitoring pattern supported by the UE. For example, the PDCCH monitoring pattern may be based on FIG. 16 and examples thereof, which will be described later.

The BS may transmit a first PDCCH in at least one XR SS set (S1505). The BS may transmit a second PDCCH based on the at least one XR SS set according to the PDCCH monitoring pattern (S1507). The BS may transmit a PDSCH (e.g., XR packet) based on the second PDCCH (S1509). Specific operations in S1503 to S1509 may be based on at least one of [Method 2-1] to [Method 2-3]. In addition, when a PDCCH monitoring adaptation operation is indicated in DCI included in the first PDCCH, the UE may perform PDCCH monitoring based on the PDCCH monitoring adaptation operation or according to a predetermined PDCCH monitoring pattern. Accordingly, the UE may reduce power consumption by reducing unnecessary PDCCH monitoring while normally receiving scheduled XR packets.

[Method 2] Method of Configuring/Indicating PDCCH Monitoring Pattern to UE not Configured with DRX

[Method 2] proposes methods by which the UE not configured with DRX monitors a PDCCH according to a PDCCH monitoring pattern to reduce power consumption. The UE may expect to receive an XR packet that is periodic and has a large data size. In addition, it may be considered that the UE is configured with a BWP specialized for XR services to support reception of XR packets. The XR-specific BWP may be a BWP configured to receive XR packets, but packets other than the XR packets may also be received in the corresponding XR-specific BWP. This is because there may be no problem even if the UE receives general traffic (e.g., eMBB) except for URLLC at the expected cycle (e.g., 16.66667 ms represented by 60 fps) of XR traffic.

[Method 2-1] Method of Allowing UE not Configured with DRX to Support XR Service

Figure 16:
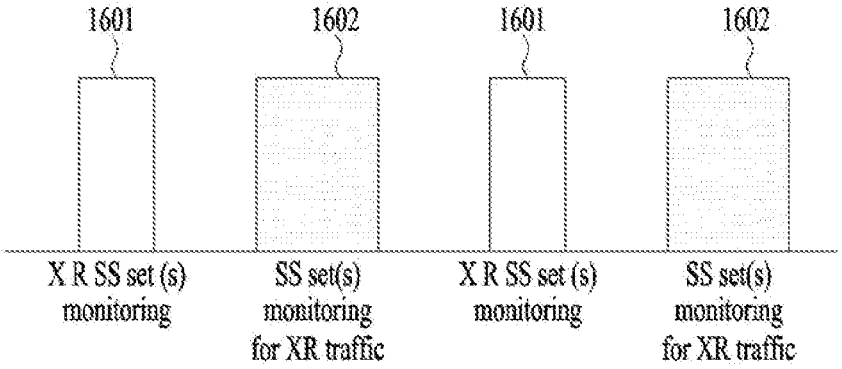
FIG. 16 is a diagram for explaining examples of [Method 2] of the present disclosure.

[Method 2-1] proposes a method of allowing the UE not configured with DRX to support XR services. To this end, the following UE operations may be defined: a default PDCCH monitoring operation in a BWP, an SS set configuration for supporting XR services, an operation after the UE detects DCI, and/or a PDCCH monitoring operation for traffic reception. FIG. 16 illustrates an exemplary PDCCH monitoring pattern for the UE not configured with DRX to support XR services and reduce power consumption.

(1) Default PDCCH Monitoring Operation in BWP

The default PDCCH monitoring operation performed in the XR-specific BWP of the UE may be defined and classified into three types (i.e., operations 1) to 3)). The three operations may correspond to an operation 1601 of FIG. 16. For example, the UE operation 1601 may trigger a UE operation 1602.

1) Monitoring of Only Specific SS Set(s)

The UE may monitor only specific SS set(s) preconfigured/predetermined for the XR-specific BWP and not monitor other SS set(s). The specific SS set(s) may be defined as XR SS set(s). The purpose of monitoring of the XR SS set(s) may be similar to the purpose of receiving, by the UE, a WUS when DRX is configured. That is, the monitoring purpose is to minimize the number and/or frequency of times that the UE performs PDCCH monitoring according to the cycle of XR traffic for power saving. For example, if the UE detects a PDCCH in XR SS set(s) 1601 of FIG. 16, the UE may monitor SS set(s) 1602 to receive the PDCCH scheduling XR traffic and the corresponding XR traffic. If the UE detects no PDCCH in the XR SS set(s) 1601, the UE may skip monitoring the SS set(s) 1602.

To this end, a monitoring occasion (MO) for the XR SS set(s) may be configured according to the cycle of XR traffic. In addition, the UE may be configured to sleep in other durations rather than the MO without performing PDCCH monitoring.

To this end, a new SS set configuration may be required. In the SS set configuration according to the current standard, a duration may be defined with the cycle of SS set monitoring and the number of consecutive slots where an SS set spans. Thus, the XR SS set may be configured to be monitored during B slots at every cycle of A slots. Since the XR SS set may be intensively monitored according to the cycle, it may be necessary to configure the MO that is not aligned with the number of slots. For example, the XR SS set may be configured such that an MO for 10 XR SS sets are arranged in four slots.

2) PDCCH Monitoring Only for Specific Duration

The UE may perform PDCCH monitoring only for a specific duration. The specific duration may be set to a window or masking. In addition, the specific duration may be determined in consideration of the cycle of XR traffic and the range of jitter. For example, the specific duration may be configured before a time point at which XR traffic is expected to be received earlier due to jitter. SS set(s) for PDCCH monitoring may be configured/indicated within the specific duration, and the SS set(s) may be XR SS set(s). In FIG. 16, the XR SS set(s) 1601 may be allocated within the specific duration determined in consideration of the range of jitter. If a PDCCH is monitored in the XR SS set(s) 1601 within the specific duration, a PDCCH scheduling XR traffic may be detected in all of the SS set(s) 1602, and the XR traffic may be received based on the detected PDCCH.

The specific duration may be configured with non-contiguous slots or symbols. Accordingly, a structure in which PDCCH monitoring and sleeping are repeated for a short duration may be configured. If the specific duration is configured with non-contiguous slots, SS set(s) monitored within the specific duration may be configured in consideration of the non-contiguous slots.

It may be considered that the specific duration is configured in the form of masking. For example, when a parameter for configuring masking is defined, and when the parameter is set to TRUE, the UE may monitor only the XR SS set(s). When the UE detects a PDCCH in the XR SS set(s) or receives a specific indication over the PDCCH detected in the XR SS set(s), the masking parameter may be set to FALSE. In this case, the UE may monitor all SS set(s) including the XR SS set(s). Then, the masking parameter may be set to TRUE again based on an indication through DCI or a timer. For example, when the UE receives DCI in any one SS set while monitoring all SS sets, or when the UE is instructed to set the masking parameter again to TRUE in the corresponding DCI, the masking parameter may be set to TRUE again. As another example, when the UE starts monitoring of all SS sets, the UE may run a timer. When the timer expires, the masking parameter may be set to TRUE again.

The specific duration may be configured based on monitoring of the XR SS set(s). For example, the UE may monitor all SS sets for the first monitoring. If the UE monitors the XR SS set(s) once more, the UE may stop monitoring all SS sets except for the XR SS set(s). For example, when the UE starts monitoring all SS sets by monitoring the XR SS set(s) and detecting the PDCCH, if the UE detects the PDCCH gain in the XR SS set(s) among all SS sets, the UE may stop monitoring the remaining SS sets except for the XR SS set(s).

3) Configuration of XR SS Set Monitoring Duration based on PDCCH Monitoring Skipping and XR SS Set Monitoring The UE may always monitor only XR SS set(s) after the end of a previously indicated PDCCH monitoring skipping duration. Thereafter, if the UE detects DCI in the XR SS set(s), the UE may start monitoring all the SS set(s). In this case, no separate configurations may be required for the XR SS set(s) as described in 1). For example, a configuration in the current NR standards may be applied in consideration of the cycle of XR traffic and jitter.

When the configuration is established as described in 3), if the UE completes reception of scheduled XR traffic, the UE may need to receive a PDCCH monitoring skipping instruction in DCI scheduling the corresponding XR traffic or other DCI. If there is no PDCCH monitoring skipping instruction, the UE may continue monitoring all SS sets without power saving until reception of next XR traffic.

(2) UE Operation and Configuration Related to Monitoring of XR SS Set(s)

The above-described operations and UE operations related XR SS set monitoring may be configured in the form of SSSG switching. A process in which when all SS sets in the BWP of the UE are configured in SSSG#1 and when XR SS set(s) are configured in SSSG#0, the UE monitors the XR SS set(s) and monitors all the SS sets based on results thereof may be interpreted as switching from SSSG#0 to SSSG#1. For example, referring to FIG. 16, when the UE detects a PDCCH in the XR SS set(s) 1601 and starts monitoring all of the SS set(s) 1602, it may be interpreted as switching from SSSG#0 including the XR SS set(s) to SSSG#1 including all SS sets.

There may be limitations on DCI formats monitored in XR SS set(s). For example, a new DCI format for supporting XR services may be considered. The new DCI format may include an indication indicating the starting point of monitoring all SS sets. The corresponding indication may indicate how many slots, how many symbols, or how many ms later the monitoring of all the SS sets starts with respect to the slot, symbol, or ms where DCI is currently received. Alternatively, the corresponding indication may indicate how much earlier or how much later PDCCH monitoring is to be performed from the expected reception time on the assumption that the UE knows the cycle of XR packets.

In addition, a PDCCH monitoring adaptation indication may be selectively included in the new DCI format. At the same time as the UE starts monitoring the entire SS set, PDCCH monitoring adaptation to be applied to the UE may be indicated by the new DCI format. For example, SSSG #2 may be configured separately, and switching to SSSG #2 may be indicated by the new DCI format. Based on the indication, the UE may start PDCCH monitoring to receive XR traffic.

In addition, when an indication of switching to monitoring all SS sets is provided in an XR SS set, and when the indication of switching to monitoring all SS sets is included in a signal received in the XR SS set in the form of a sequence, the power consumption of the UE due to blind detection may be reduced.

(3) UE Operation after Detection of PDCCH in XR SS Set or all SS Sets

After the UE detects a PDCCH in XR SS set(s) or all SS sets, the UE may operate based on a PDCCH monitoring adaptation indication included in DCI of the corresponding PDCCH. If the corresponding DCI includes no PDCCH monitoring adaptation indication, the UE may perform a predetermined operation (e.g., operation 1), which is the default monitoring operation in the BWP or operation 2)).

Alternatively, the UE may switch to an SSSG configured for reception of XR traffic as described above.

In the above example, all SS sets configured for the BWP are assumed to be included in the switched SSSG. However, the corresponding SSSG may include SS sets configured only for the XR traffic reception. If SSSG switching is implemented, the position of a specific duration for monitoring XR SS set(s) may be configured in consideration of the application delay. When the UE supports XR services, it may be assumed that the UE may support UE processing capability 2. After detecting the PDCCH, configurations for the window or masking of the specific duration may be ignored. Thus, in the above example, the UE may monitor the PDCCH to receive the XR traffic.

DCI scheduling the last transport block (TB) in the XR traffic may include a PDCCH monitoring adaptation indication field. Regarding the above-described operation, monitoring of only the XR SS set(s) for power saving may be indicated by the corresponding PDCCH monitoring adaptation indication field. Alternatively, if the UE detects the PDCCH in the XR SS set(s) while monitoring all the SS sets or SS sets for the XR traffic, the UE may switch to monitoring only the XR SS set(s) for power saving.

[Method 2-2] When XR Traffic is Multi-Stream

The XR traffic model may be related to a single stream as described above, but the XR traffic model may be related to a multi-stream.

(1) GOP-Based I-Frame+P-Frame

A group of picture (GOP)-based model may be considered as one example of the multi-stream. The definition of the GOP-based model is shown in Table 2 below, which is extracted from TR 38.838.

TABLE 2

| 5.1.2.1 Option 1 (I + P) |
| --- |
| For Option 1, two streams (I-stream and P-stream) are modelled according to Table 5.1-5.<br>Stream 1: I stream<br>Stream 2: P stream<br>Depending on the video encoding scheme, two additional sub models—slice based, and Group of Picture (GOP)-based models are defined.<br>Slice-based: In this encoding scheme, a single video frame is divided into N slices. Out of N, one slice is I slice and remaining N-1 slices are P slices. N packets (one I and N-1 P) packets corresponds to one video frame arriving at the same time.<br>GOP-based: In this encoding scheme, a single video frame is either I frame or P frame. I frame is transmitted every K frames, where K is the GOP size, i.e., every group of picture. One video frame arrives at a time as a packet. |

Table 5.1.2.1-1:
Statistical parameters for Option 1 multi streams DL traffic model

| | Two data streams | | | |
| --- | --- | --- | --- | --- |
| | Option 1A: slice-based | | Option 1B: GOP-based | |
| | I-stream | P-stream | I-stream | P-stream |
| Packet modelling | Slice-level | | Frame-level | |
| Traffic pattern | Both streams are periodic at 60 fps with the same jitter model as for single stream. | | Follow the GOP structure, where GOP size K = 8 with the same jitter model as for single stream. | |
| Number of packets per stream at a time | 1 | N-1<br>N = 8: the number of slices per frame. | I-frame: 1 or 0<br>P-frame: 0 or 1<br>At each time instant, there is either only one I-stream packet or only one P-stream packet | |
| Average data rate per stream | $R_I = R * \dfrac{\alpha}{N-1+\alpha}$ | $R_P = R * \dfrac{N-1}{N-1+\alpha}$ | $R_I = R * \dfrac{\alpha}{K-1+\alpha}$ | $R_P = R * \dfrac{K-1}{K-1+\alpha}$ |
| Packet size distribution | R: average data rate of a single stream video<br>$\alpha$: average size ratio between one I-frame/slice and one P-frame/slice<br>$\alpha = 1.5, 2$ (baseline)<br>$\alpha = 3$ (optional)<br>Truncated Gaussian distribution | | | |
| | Mean = $\dfrac{R_I}{FPS}$ | Mean = $\dfrac{R_P}{FPS * (N-1)}$ | Mean = $\dfrac{R_I *}{\dfrac{K}{FPS}}$ | Mean = $\dfrac{R_P *}{\dfrac{K}{FPS * (K-1)}}$ |
| | [STD, Max, Min]: [10.5, 150, 50]% of Mean packet size<br>FPS is the frame rate of the single stream video<br>Depends on application, see 6.3.1, 6.4.1, 6.5.1 for VR, CG, AR respectively. | | | |
| PDB | Depends on application, see 6.3.1, 6.4.1, 6.5.1 for VR, CG, AR respectively. | | | |

For the traffic model of GOP-based I-frame+P-frame, an XR packet may be the I-frame or P-frame, and the I-frame and P-frame may have different data rates and different packet sizes. In addition, reception of the P-frame may be based on the I-frame. For example, the data rate and/or packet size of the I-frame may be larger than that of the P-frame. That is, image information included in the I-frame may be greater than image information included in the P-frame. The P-frame may be received between two I-frames. The UE may output an image of a viewpoint corresponding to the P-frame based on image information in two I-frames received before and after the P-frame. For example, the P-frame may include information on the difference between the previously received I-frame and the subsequently received I-frame. Therefore, when the UE outputs the image of the viewpoint corresponding to the P-frame, the UE may use information in the I-frame as it is to obtain information on parts that are not included in the P-frame or parts recognized as identical to the I-frame and may use information included in the P-frame only for different parts in order to output the image of the viewpoint corresponding to the P-frame.

Therefore, it may be considered that SS set monitoring configured according to the I-frame and P-frame is instructed/configured. It may be also be considered that the SS set monitoring is configured in the form of an SSSG. In general, when the I-frame is not received, a serious problem may be caused. This is because if the I-frame is not received, it is difficult to completely output video even if the P-frame is received. The I-frame has a larger packet size and a larger data rate than the P-frame. Therefore, dense PDCCH monitoring may be configured at a time of receiving the I-frame to increase the probability of receiving the I-frame. On the other hand, relatively sparse PDCCH monitoring may be configured for the P-frame (i.e., at a time of receiving the P-frame), thereby expecting the power saving effect of the UE.

In addition, if the SS set is configured separately for the I-frame and P-frame, a low SS set ID may be configured for the I-frame, and a high SS set ID may be configured for the P-frame. Accordingly, monitoring of the I-frame may be prevented from being hindered by the BD/CCE limit.

Considering that the UE receives the P-frame based on reception of the I-frame, it may be understood that the reception result of the I-frame affects the reception of the P-frame. When the UE receives the I-frame or detects scheduling DCI for the corresponding I-frame, the UE may be configured to prepare for receiving the P-frame after a predetermined offset from the corresponding reception/detection time point. This may be based on the fact that XR traffic is periodic.

That is, a PDCCH monitoring pattern may be configured for a set of GOP-based I-frames and P-frames, rather than for reception of one XR packet. For example, XR traffic may be received in the following order: I-frame, P-frame, P-frame, and P-frame. In this case, the PDCCH monitoring pattern may be configured for all four packets. The PDCCH monitoring pattern for monitoring the subsequent P-frames may be determined based on reception of the I-frame. For example, the PDCCH monitoring pattern may be determined such that the P-frames are monitored after a predetermined offset from the I-frame reception.

To this end, SS sets may be classified into a primary SS set and a secondary SS set. In this case, the primary SS set may be to receive the I-frame, and the secondary SS set may be to receive the P-frame. The primary SS set and the secondary SS set may be configured in the form of an SSSG.

If a PDCCH monitoring pattern is determined based on the I-frame among the GOP-based I-frame and P-frame, it may be necessary to determine when the P-frame is received and when the I-frame is received again. That is, it may be necessary to determine a time at which reception of the P-frame ends and a time at which reception of the I-frame starts again. For example, the corresponding points in time may be determined based on a specific point in time (e.g., based on a timer) or based on how many times the UE receives a TB.

(2) Video+Audio/Data

A model of video+audio/data may be considered as an example of the multi-stream. The definition of the model of video+audio/data is shown in Table 3 below, which is extracted from TR 38.838.

TABLE 3

| 5.1.2.2 Option 2 (video + audio/data) | | | |
|---|---|---|---|
| For Option 2, two streams (video + audio/data) are modelled. | | | |
| Stream 1: video | | | |
| Stream 2: audio/data | | | |
| The stream 1 - video stream follows the generic single stream model given in clause 5.1.1. | | | |
| The stream 2 - audio/data a periodic traffic with following parameters. | | | |
| Table 5.1.2.2-1: | | | |
| Statistical parameter values for Option 2 multi streams model | | | |
| Parameters | unit | Baseline values for evaluation | Optional values for evaluation |
| Periodicity P | ms | 10 | |
| Data rate: R | Mbps | 0.756, 1.12 | |
| Packet size | byte | R × 1e6 × P/1000/8 | |
| PDB | ms | 30 | Other values can be optionally evaluated |
| Packet Success Rate | % | 99 | 99.9 |

A video stream is identical to the general XR traffic DL model. Thus, the video stream may be assumed to have a transmission cycle of 16.6667 ms. An audio stream may be assumed to have a cycle of 10 ms as shown in Table 3 above. That is, for the model of video+audio/data, the two streams may have different cycles. To this end, the cycle of the SS set for PDCCH monitoring or the location of the 'specific duration' may be configured to receive the two streams.

When two streams have different cycles, the following two cases may be considered: when video and audio streams appear independently, and when video and audio streams overlap to each other. To support the above two cases, an appropriate indication for receiving the video stream and/or audio stream may be provided by PDCCH monitoring adaptation related to PDCCH monitoring for XR traffic as described in the proposed methods. For example, three SSSGs may be configured as follows: SSSG for video, SSSG for audio, and SSSG for both, and SSSG switching may be performed for each frame based on a PDCCH monitoring adaptation indication. Alternatively, when two SSSGs are configured as follows: SSSG for video and SSSG for audio and when two streams are simultaneously received, switching to the SSSG for video may be performed.

The operations in consideration of the multi-streams of Method 2-2 may also be applied to Method 1 based on the same principle.

[Method 2-3] Additional UE Operation Considered for Power Saving

CSI reporting and SRS transmission performed by the UE within a BWP may be set different from each other. For example, in order to reduce power consumption in a duration where PDCCH monitoring is not performed (for example, a duration having no MO for XR SS set(s) when only the XR SS set(s) are monitored), the CSI reporting and SRS transmission may be stopped. When monitoring of the XR SS set(s) starts, the CSI reporting and SRS transmission may also start.

Alternatively, for better channel estimation, the CSI reporting and SRS transmission may be performed before a predetermined number of slots from monitoring of the XR SS set(s) (e.g., from the starting or ending point of the XR SS set monitoring).

According to [Method 2], even if the UE is not configured with the DRX operation, a PDCCH monitoring pattern may be indicated in an XR SS set, and the UE may perform PDCCH monitoring according to the indication, thereby reducing the frequency and number of times that the UE performs the PDCCH monitoring. Accordingly, the power consumption of the UE may be reduced.

In addition, an appropriate PDCCH monitoring pattern may be configured depending on the stream characteristics of an XR packet received by the UE. Thus, the number and frequency of times of PDCCH monitoring may be adjusted depending on the characteristics of the XR packet, thereby improving the efficiency of data reception.

Some of the methods proposed in the present disclosure may be selectively applied. Each method may be applied in an independent form without any combination, or one or more of the methods may be applied in combination. Some of the terms, symbols, and orders used to describe the proposed methods may be replaced with other terms, symbols, and orders as long as the principles of the present disclosure are maintained.

In the present disclosure, to explain the principles of the proposed methods, the DRX structure and configuration of the UE, the PDCCH monitoring adaptation operation, the PDCCH monitoring pattern, and the UE operation configuration for transmitting and receiving DCI are illustrated based on an arbitrary structure. However, unless otherwise stated, the proposed methods are not limited to the type of UE operation.

Therefore, it is obvious that unless otherwise stated, the methods proposed in the present disclosure are applicable to any DRX structure, PDCCH monitoring adaptation operation, or PDCCH monitoring pattern operation as long as the principles of the present disclosure are not infringed, The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 17:
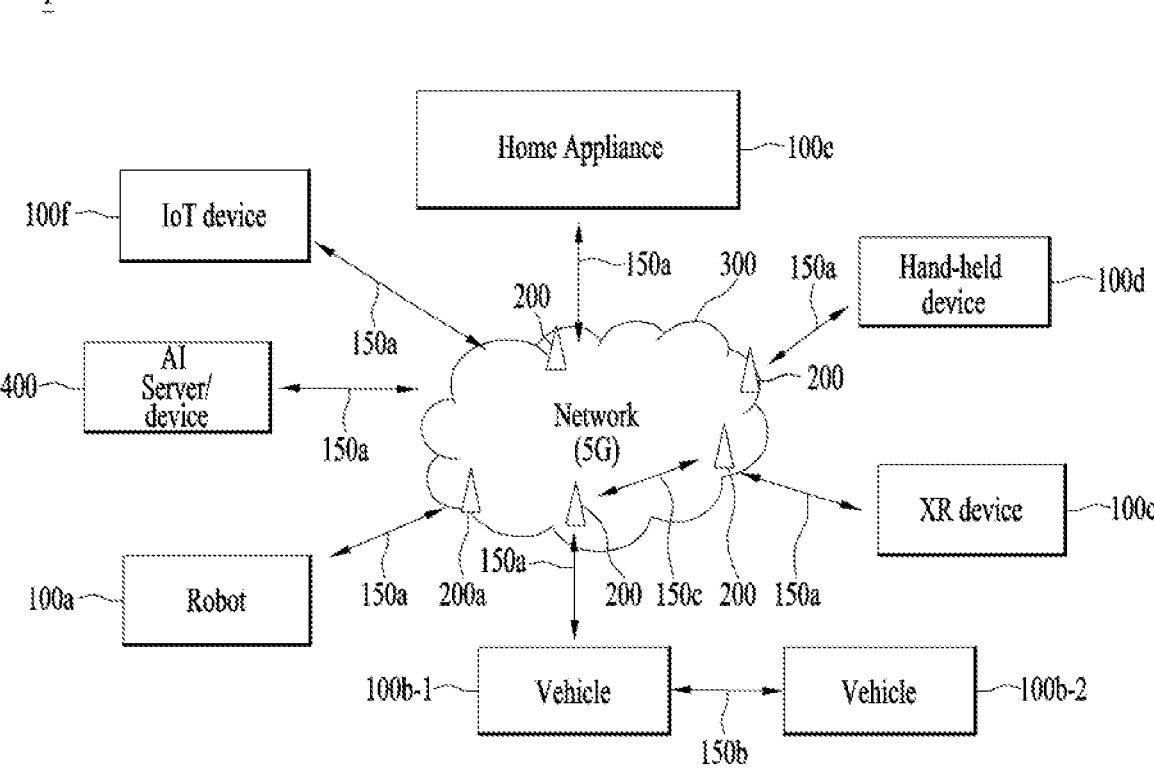
FIG. 17 illustrates an exemplary communication system applied to the present disclosure.

FIG. 17 illustrates a communication system 1 applied to the present disclosure.

Referring to FIG. 17, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/ network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/ demodulation, and resource mapping/demapping), and resource allocation processes, for transmitting/receiving wireless signals, may be performed based on the various proposals of the present disclosure.

Figure 18:
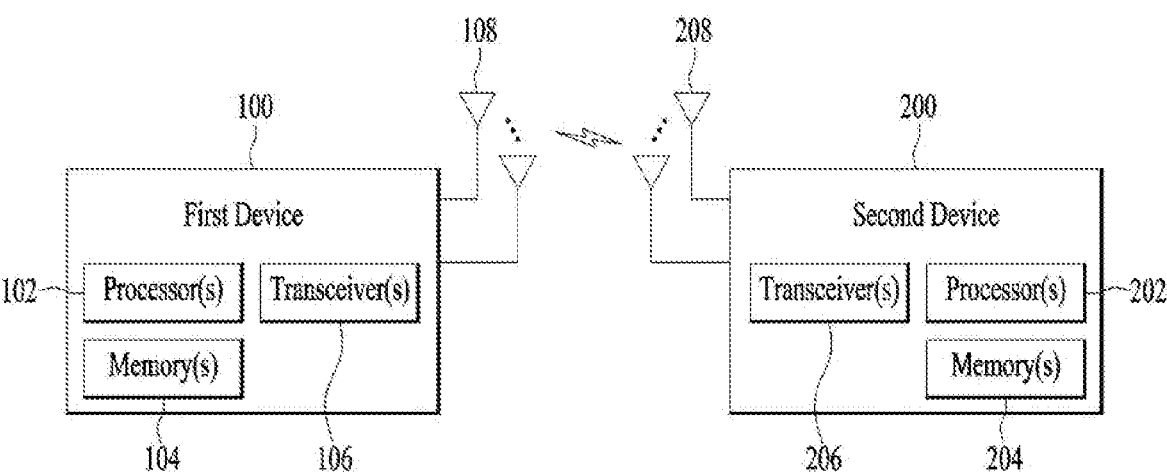
FIG. 18 illustrates an exemplary wireless device applicable to the present disclosure.

FIG. 18 illustrates wireless devices applicable to the present disclosure.

Referring to FIG. 18, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 17.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information/signals in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor(s) 102 of the first wireless device 100 and stored in the memory(s) 104 of the first wireless device 100, according to an embodiment of the present disclosure will now be described.

Although the following operations will be described based on a control operation of the processor(s) 102 in terms of the processor(s) 102, software code for performing such an operation may be stored in the memory 104. For example, in the present disclosure, the at least one memory(s) 104 may store instructions or programs as a computer-readable storage medium. The instructions or the programs may cause, when executed, at least one processor operably connected to the at least one memory to perform operations according to embodiments or implementations of the present disclosure, related to the following operations.

As one example, the processor(s) 102 may report capability information including information on a PDCCH monitoring adaptation pattern through the transceiver(s) 106. In this case, the information on the PDCCH monitoring adaptation pattern may include whether PDCCH monitoring adaptation such as PDCCH monitoring skipping and SSSG switching is supported.

The processor(s) 102 may receive at least one piece of information on a DRX operation and/or PDCCH monitoring adaptation pattern determined based on the capability information on the processor(s) 102 and/or the PDCCH monitoring adaptation pattern for supporting XR services. In this case, the at least one piece of information may be received in higher layer signaling (e.g., RRC signaling) and/or over a PDCCH.

The processor(s) 102 may receive a first PDCCH related to the PDCCH monitoring adaptation pattern through the transceiver(s) 106. The processor(s) 102 may monitor a second PDCCH based on the first PDCCH and receive a PDSCH (e.g., XR packet) through the transceiver(s) 106. When only one PDCCH monitoring adaptation pattern is configured during the reception of the at least one piece of information, monitoring the first PDCCH may be skipped. The second PDCCH may be monitored based on the PDCCH monitoring adaptation pattern configured during the reception of the at least one piece of information. Upon detecting the second PDCCH, the processor(s) 102 may receive the PDSCH (e.g., XR packet) based on the second PDCCH through the transceiver(s) 106.

Specific operations of the processor(s) 102 may be based on [Method 1-1] and/or [Method 1-2].

As another example, the processor(s) 102 may report first information on the capability of the processor(s) 102 including information on a PDCCH monitoring pattern through transceiver(s) 106. In this case, the information on the PDCCH monitoring pattern may include information on whether PDCCH monitoring adaptation operations such as PDCCH monitoring skipping and SSSG switching are supported.

The processor(s) 102 may receive second information for configuring a PDCCH monitoring pattern from the BS through the transceiver(s) 106. In this case, the second information may be determined in consideration of the first information on the capability of the processor(s) 102, information on whether the processor(s) 102 supports XR services, and/or the PDCCH monitoring pattern supported by the processor(s) 102. For example, the PDCCH monitoring pattern may be based on FIG. 16 and the above-described examples thereof.

The processor(s) 102 may receive a first PDCCH in at least one XR SS set through the transceiver(s) 106. The processor(s) 102 may monitor a second PDCCH based on the at least one XR SS set according to the PDCCH monitoring pattern. The processor(s) 102 may receive a PDSCH (e.g., XR packet) based on the second PDCCH. Specific operations of the processor(s) 102 may be based on at least one of [Method 2-1] to [Method 2-3]. In addition, when a PDCCH monitoring adaptation operation is indicated in DCI included in the first PDCCH, the UE may perform PDCCH monitoring based on the PDCCH monitoring adaptation operation or according to a predetermined PDCCH monitoring pattern.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 206 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor(s) 202 of the second wireless device 200 and stored in the memory(s) 204 of the second wireless device 200, according to an embodiment of the present disclosure will now be described.

Although the following operations will be described based on a control operation of the processor(s) 202 in terms of the processor(s) 202, software code for performing such an operation may be stored in the memory(s) 204. For example, in the present disclosure, the at least one memory(s) 204 may store instructions or programs as a computer-readable storage medium. The instructions or the programs may cause, when executed, at least one processor operably connected to the at least one memory to perform operations according to embodiments or implementations of the present disclosure, related to the following operations.

As one example, the processor(s) 202 may receive capability information including information on a PDCCH monitoring adaptation pattern from the UE through the transceiver(s) 206. In this case, the information on the PDCCH monitoring adaptation pattern may include whether PDCCH monitoring adaptation such as PDCCH monitoring skipping and SSSG switching is supported.

The processor(s) 202 may determine a DRX operation and/or PDCCH monitoring adaptation pattern based on the capability information on the UE and/or the PDCCH monitoring adaptation pattern for supporting XR services. In addition, the processor(s) 202 may transmit at least one piece of information on the determined DRX operation and/or PDCCH monitoring adaptation pattern through the transceiver(s) 206. In this case, the at least one piece of information may be transmitted through higher layer signaling (e.g., RRC signaling) and/or over a PDCCH.

The processor(s) 202 may transmit a first PDCCH related to the PDCCH monitoring adaptation pattern (S905) through the transceiver(s) 206. The processor(s) 202 may transmit a second PDCCH and a PDSCH (e.g., XR packet) based on the first PDCCH through the transceiver(s) 206. When only one PDCCH monitoring adaptation pattern is configured during the transmission of the at least one piece of information, transmitting the first PDCCH may be skipped. The processor(s) 202 may transmit the second PDCCH through the transceiver(s) 206 based on the PDCCH monitoring adaptation pattern configured during the transmission of the at least one piece of information. The processor(s) 202 may transmit the PDSCH (e.g., an XR packet) through the transceiver(s) 206 based on the second PDCCH.

Specific operations of the processor(s) 202 may be based on [Method 1-1] and/or [Method 1-2].

As another example, the processor(s) 202 may receive first information on the capability of the UE including information on a PDCCH monitoring pattern through the transceiver(s) 206. In this case, the information on the PDCCH monitoring pattern may include information on whether PDCCH monitoring adaptation operations such as PDCCH monitoring skipping and SSSG switching are supported.

The processor(s) 202 may transmit second information for configuring a PDCCH monitoring pattern through the transceiver(s) 206. In this case, the second information may be determined in consideration of the first information on the capability of the UE, information on whether the UE supports XR services, and/or the PDCCH monitoring pattern supported by the UE. For example, the PDCCH monitoring pattern may be based on FIG. 16 and examples thereof, which will be described later.

The processor(s) 202 may transmit a first PDCCH in at least one XR SS set through the transceiver(s) 206. The processor(s) 202 may transmit a second PDCCH through the transceiver(s) 206 based on the at least one XR SS set according to the PDCCH monitoring pattern. The processor(s) 202 may transmit a PDSCH (e.g., XR packet) based on the second PDCCH. Specific operations of the processor(s) 202 may be based on at least one of [Method 2-1] to [Method 2-3]. In addition, when a PDCCH monitoring adaptation operation is indicated in DCI included in the first PDCCH, the UE may perform PDCCH monitoring based on the PDCCH monitoring adaptation operation or according to a predetermined PDCCH monitoring pattern.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 19:
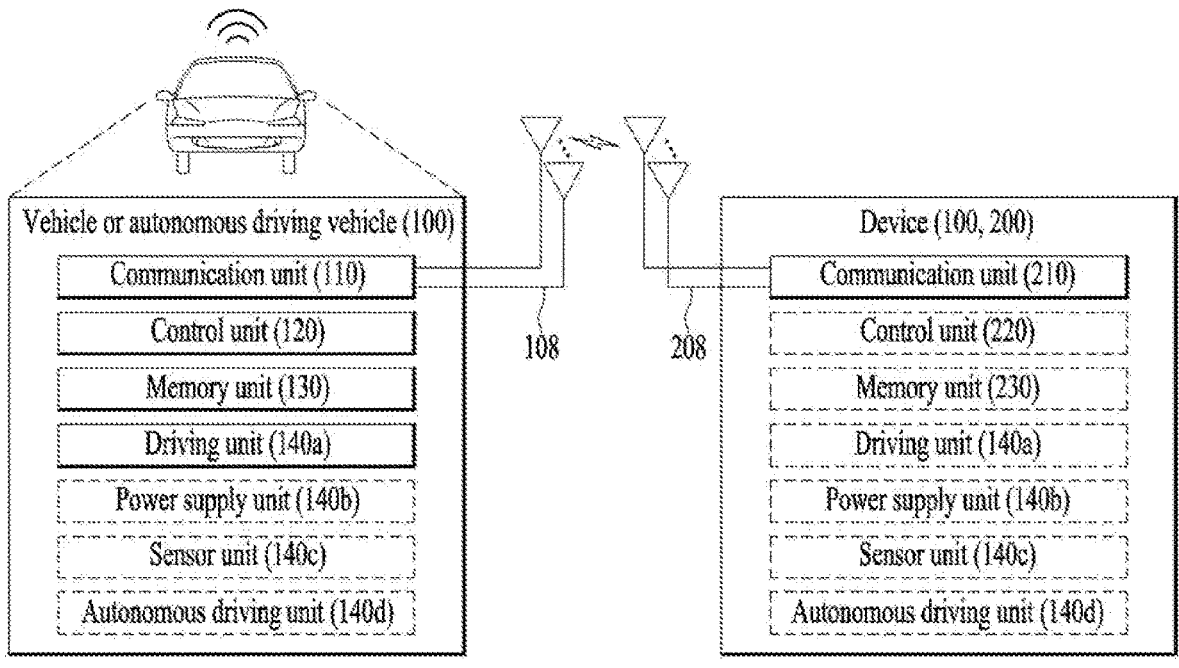
FIG. 19 illustrates an exemplary vehicle or autonomous driving vehicle applicable to the present disclosure.

FIG. 19 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 20:
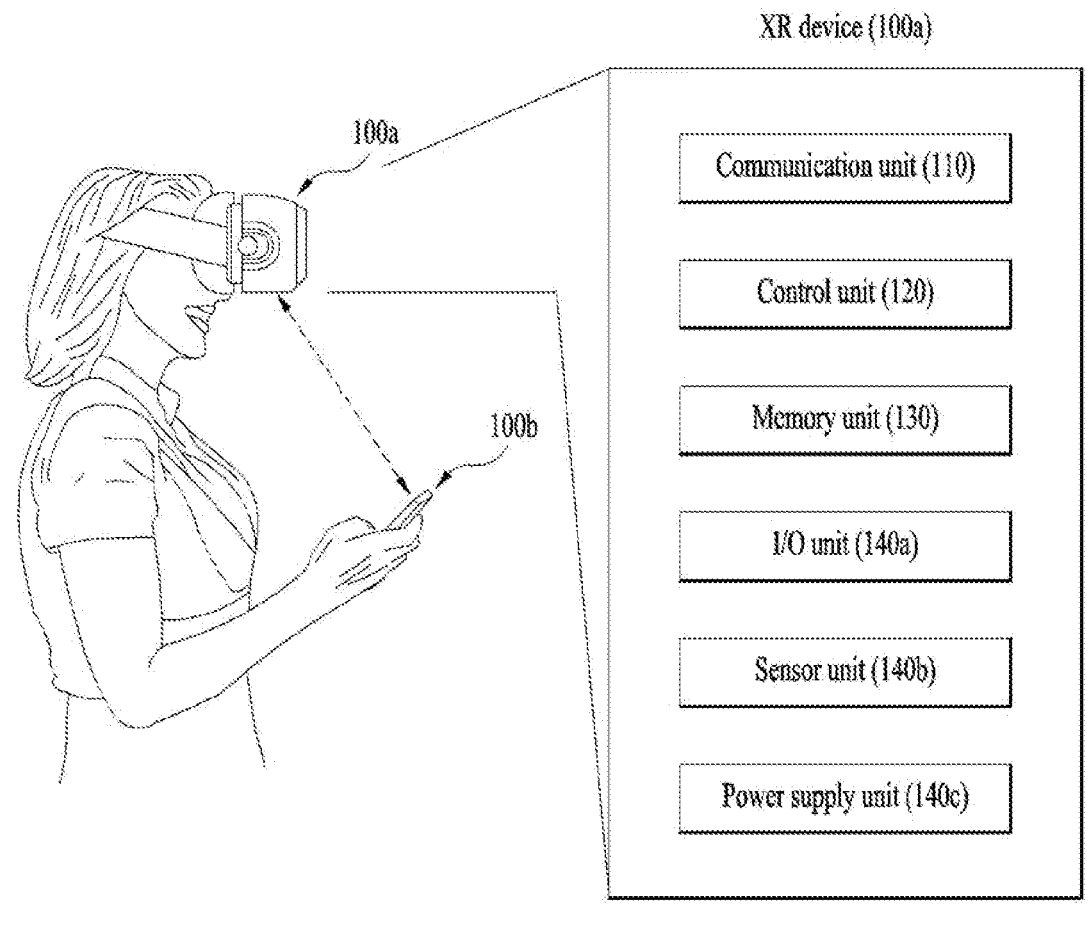
FIG. 20 illustrates an extended reality (XR) device applicable to the present disclosure.

FIG. 20 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 20, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 19, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and meta-data generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As is apparent from the above description, the present disclosure has effects as follows.

According to the present disclosure, an operation of reducing power consumption by reducing unnecessary physical downlink control channel (PDCCH) monitoring when a user equipment (UE) supporting extended reality (XR) services monitors a PDCCH to receive XR packets periodically may be supported.

The present disclosure is not limited to XR services. That is, an UE operation capable of saving power may be supported regardless of the type of traffic as long as the traffic is scheduled to be transmitted periodically.

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

What is claimed is:

1. A method performed by a user equipment (UE), the method comprising:

receiving, through higher layer signaling, configuration information for search space (SS) sets including a first SS set and one or more second SS sets;

monitoring first physical downlink control channel (PDCCH) candidates in the first SS set to detect first downlink control information (DCI);

based on that the first DCI is detected, monitoring second PDCCH candidates in the SS sets including the first SS set and the one or more second SS sets to detect second DCI; and after detecting the second DCI as a result of the monitoring the second PDCCH candidates, determining, based on a SS set in which the second DCI is detected, at least one SS set to be used for subsequent PDCCH candidate monitoring, wherein the SS set in which the second DCI is detected is one of the first SS set and the one or more second SS sets.

2. The method of claim 1, wherein the UE is not configured with a discontinuous reception (DRX) operation.

3. The method of claim 1, wherein based on that the SS set in which the second DCI is detected is the first SS set, the one or more second SS sets are not used for the subsequent PDCCH candidate monitoring, and wherein based on that the SS set in which the second DCI is detected is not the first SS set, the one or more second SS sets are used for the subsequent PDCCH candidate monitoring.

4. The method of claim 1, wherein based on that the SS set in which the second DCI is detected is not the first SS set, only the first SS set is used for the subsequent PDCCH candidate monitoring.

5. The method of claim 1, wherein the first SS set is related to extended reality (XR) service.

6. The method of claim 1, wherein the UE monitors the first PDCCH candidates only in the first SS set.

7. A user equipment (UE) comprising:

at least one transceiver;

at least one processor; and at least one memory operably connected to the at least one processor and configured to store instructions that, when executed, cause the at least one processor to perform operations comprising:

receiving, through higher layer signaling, configuration information for search space (SS) sets including a first SS set and one or more second SS sets;

monitoring first physical downlink control channel (PDCCH) candidates in the first SS set to detect first downlink control information (DCI);

based on that the first DCI is detected, monitoring second PDCCH candidates in the SS sets including the first SS set and the one or more second SS sets to detect second DCI; and after detecting the second DCI as a result of the monitoring the second PDCCH candidates, determining, based on a SS set in which the second DCI is detected, at least one SS set to be used for subsequent PDCCH candidate monitoring wherein the SS set in which the second DCI is detected is one of the first SS set and the one or more second SS sets.

8. The UE of claim 7, wherein the UE is not configured with a discontinuous reception (DRX) operation.

9. The UE of claim 7, wherein based on that the SS set in which the second DCI is detected is the first SS set, the one or more second SS sets are not for the subsequent PDCCH candidate monitoring, and wherein based on that the SS set in which the second DCI is detected is not the first SS set, the one or more second SS sets are used for the subsequent PDCCH candidate monitoring.

10. The UE of claim 7, wherein based on that the SS set in which the second DCI is detected is not the first SS set, only the first SS set is used for the subsequent PDCCH candidate monitoring.

11. The UE of claim 7, wherein the first SS set is related to extended reality (XR) service.

12. A base station comprising:

at least one transceiver;

at least one processor; and at least one memory operably connected to the at least one processor and configured to store instructions that, when executed, cause the at least one processor to perform operations comprising:

transmitting, through higher layer signaling, configuration information for search space (SS) sets including a first SS set and one or more second SS sets;

transmitting first downlink control information (DCI) based on a first physical downlink control channel (PDCCH) candidate determined in the first SS set;

transmitting second DCI based on a second PDCCH candidate determined in the SS sets including the first SS set and the one or more second SS sets; and determining, based on a SS set used for transmitting the second DCI, at least one SS set to be used for subsequent DCI transmission, wherein the SS set used for transmitting the second DCI is one of the first SS set and the one or more second SS sets.

\* \* \* \* \*